(12) United States Patent
Chien et al.

(10) Patent No.: US 11,044,746 B2
(45) Date of Patent: Jun. 22, 2021

(54) BASE STATION AND USER EQUIPMENT FOR MOBILE COMMUNICATION SYSTEM

(71) Applicant: Institute For Information Industry, Taipei (TW)

(72) Inventors: Chun-Che Chien, Taipei (TW); Hai-Han Wang, Taipei (TW)

(73) Assignee: Institute For Information Industry, Taipei (TW)

( * ) Notice: Subject to any disclaimer, the term of this patent is extended or adjusted under 35 U.S.C. 154(b) by 37 days.

(21) Appl. No.: 16/533,775

(22) Filed: Aug. 6, 2019

(65) Prior Publication Data

US 2020/0053766 A1 Feb. 13, 2020

Related U.S. Application Data

(60) Provisional application No. 62/715,297, filed on Aug. 7, 2018.

(51) Int. Cl.
*H04W 72/12* (2009.01)
*H04W 72/04* (2009.01)
(Continued)

(52) U.S. Cl.
CPC ....... *H04W 72/1289* (2013.01); *H04L 1/1812* (2013.01); *H04L 1/1854* (2013.01);
(Continued)

(58) Field of Classification Search
CPC ... H04L 1/1812; H04L 1/1822; H04L 1/1854; H04L 1/1861; H04L 1/1864;
(Continued)

(56) References Cited

U.S. PATENT DOCUMENTS 9,532,316 B2 * 12/2016 Han .................. H04W 72/0446
10,341,998 B2 * 7/2019 Nogami ............ H04W 72/0413
(Continued)

FOREIGN PATENT DOCUMENTS

| CN | 110741580 A | * | 1/2020 | ........ H04W 72/0413 |
| CN | 110771079 A | * | 2/2020 | ........... H04L 5/0007 |

(Continued)

OTHER PUBLICATIONS

Nokia et al., PUCCH Resource Allocation, Nov. 27, 2017, 3GPP, 3GPP TSG-RAN WG1 #91, Tdoc: R1-1720014 (Year: 2017).*

(Continued)

*Primary Examiner* — Eric Nowlin
(74) *Attorney, Agent, or Firm* — Skaar Ulbrich Macari, P.A.

(57) ABSTRACT

A base station (BS) and a user equipment (UE) for a mobile communication system are provided. The BS generates first downlink information (DCI) related to a first service type and transmits the first DCI indicating a first physical uplink control channel (PUCCH) resource to the UE. The BS further generates second DCI related to a second service type and transmits the second DCI indicating a second PUCCH resource to the UE. The first service type and the second service type have different priorities. The starting symbol of the first PUCCH resource is located within a first type assigned sub-slot of a plurality of first type sub-slots of a slot, and the starting symbol of the second PUCCH resource is located within a second type assigned sub-slot of a plurality of second type sub-slots of the slot.

18 Claims, 9 Drawing Sheets

(51) Int. Cl.
*H04L 1/18* (2006.01)
*H04L 5/00* (2006.01)

(52) U.S. Cl.
CPC .......... *H04L 1/1861* (2013.01); *H04L 5/0053* (2013.01); *H04L 5/0055* (2013.01); *H04W 72/042* (2013.01); *H04W 72/0446* (2013.01); *H04W 72/1242* (2013.01); *H04L 5/001* (2013.01)

(58) Field of Classification Search
CPC ..... H04L 1/1896; H04L 5/001; H04L 5/0053; H04L 5/0055; H04W 72/04; H04W 72/0413; H04W 72/042; H04W 72/0446; H04W 72/1242
See application file for complete search history.

(56) References Cited

U.S. PATENT DOCUMENTS

| | | | | |
|---|---|---|---|---|
| 2014/0185534 | A1* | 7/2014 | Vos | H04L 1/1845 370/329 |
| 2015/0341922 | A1* | 11/2015 | Han | H04L 47/12 370/280 |
| 2017/0373801 | A1* | 12/2017 | Bergstrom | H04L 1/1896 |
| 2018/0070341 | A1* | 3/2018 | Islam | H04L 1/1887 |
| 2018/0115966 | A1* | 4/2018 | Chen | H04W 68/02 |
| 2018/0167967 | A1* | 6/2018 | Li | H04W 72/1268 |
| 2018/0192417 | A1* | 7/2018 | Yin | H04L 5/005 |
| 2018/0262311 | A1* | 9/2018 | Wang | H04L 5/0055 |
| 2018/0270799 | A1* | 9/2018 | Noh | H04L 5/0094 |
| 2018/0279297 | A1* | 9/2018 | Nogami | H04W 72/042 |
| 2018/0279353 | A1* | 9/2018 | Shaheen | H04W 72/1289 |
| 2018/0324770 | A1* | 11/2018 | Nogami | H04L 5/005 |
| 2018/0368173 | A1* | 12/2018 | Shaheen | H04W 72/1289 |
| 2019/0260546 | A1* | 8/2019 | Kilinc | H04L 5/0053 |
| 2019/0268930 | A1* | 8/2019 | Rudolf | H04L 5/0094 |
| 2019/0342877 | A1* | 11/2019 | Matsumura | H04L 25/0226 |
| 2019/0349973 | A1* | 11/2019 | Yang | H04W 72/1257 |
| 2019/0363833 | A1* | 11/2019 | Wang | H04L 1/189 |
| 2019/0379487 | A1* | 12/2019 | Hwang | H04L 1/0061 |
| 2019/0386728 | A1* | 12/2019 | Yoshimura | H04B 7/0413 |
| 2019/0393987 | A1* | 12/2019 | Hong | H04L 1/0057 |
| 2020/0015223 | A1* | 1/2020 | Matsumura | H04L 5/0051 |
| 2020/0015256 | A1* | 1/2020 | Lee | H04W 72/14 |
| 2020/0077470 | A1* | 3/2020 | Xiong | H04L 1/1854 |
| 2020/0099498 | A1* | 3/2020 | Guthmann | H04L 5/0098 |
| 2020/0100219 | A1* | 3/2020 | Takeda | H04L 5/0053 |
| 2020/0100241 | A1* | 3/2020 | Takeda | H04L 5/0005 |
| 2020/0136777 | A1* | 4/2020 | He | H04W 72/1284 |
| 2020/0137792 | A1* | 4/2020 | Yoon | H04L 5/0041 |
| 2020/0153672 | A1* | 5/2020 | Choi | H04W 72/042 |
| 2020/0154427 | A1* | 5/2020 | Choi | H04W 72/0413 |
| 2020/0178240 | A1* | 6/2020 | Zhang | H04L 5/0057 |
| 2020/0195387 | A1* | 6/2020 | Matsumura | H04W 72/04 |
| 2020/0196333 | A1* | 6/2020 | Lin | H04W 72/0446 |
| 2020/0236700 | A1* | 7/2020 | Matsumura | H04L 5/0007 |
| 2020/0244390 | A1* | 7/2020 | Takeda | H04L 1/0013 |
| 2020/0245336 | A1* | 7/2020 | Matsumura | H04W 72/0413 |
| 2020/0288458 | A1* | 9/2020 | Takeda | H04L 1/16 |
| 2020/0296713 | A1* | 9/2020 | Matsumura | H04W 72/12 |
| 2020/0304274 | A1* | 9/2020 | Matsumura | H04B 1/7136 |
| 2020/0305146 | A1* | 9/2020 | Matsumura | H04W 72/0413 |
| 2020/0351863 | A1* | 11/2020 | Matsumura | H04W 72/0413 |

FOREIGN PATENT DOCUMENTS

| | | | | | |
|---|---|---|---|---|---|
| EP | | 3635905 | A1 * | 4/2020 | ........... H04L 1/1671 |
| EP | | 3639428 | A1 * | 4/2020 | ........... H04L 1/0026 |
| WO | WO-2018227208 | A1 * | 12/2018 | ........ H04W 72/1284 |
| WO | WO-2018227538 | A1 * | 12/2018 | ........... H04L 5/0055 |
| WO | WO-2018228523 | A1 * | 12/2018 | ........... H04L 1/0026 |
| WO | WO-2020204560 | A1 * | 10/2020 | ............ H04W 76/28 |

OTHER PUBLICATIONS

OPPO, Summary of RAN1#91 Tdocs on PUCCH resource allocation, Nov. 27, 2017, 3GPP, 3GPP TSG-RAN WG1 #91, Tdoc: R1-1721360 (Year: 2017).*
OPPO, Summary of offline discussion on PUCCH resource allocation , Nov. 27, 2017, 3GPP, 3GPP TSG-RAN WG1 #91, Tdoc: R1-1721685 (Year: 2017).*
Nokia et al., On further study of compact DCI for URLLC, Apr. 16, 2018, 3GPP, 3GPP TSG-RAN WG1 Meeting #92bis, Tdoc: R1-1805268 (Year: 2018).*
Huawei et al., Remaining issues on DCI contents and format, May 21, 2018, 3GPP, 3GPP TSG RAN WG1 Meeting #93, Tdoc: R1-1805882 (Year: 2018).*
Huawei et al., DCI design for URLLC, May 21, 2018, 3GPP, 3GPP TSG RAN WG1 Meeting #93, Tdoc: R1-1805902 (Year: 2018).*
Vivo, Remaining issues on eMBB DCI format, May 21, 2018, 3GPP, 3GPP TSG RAN WG1 Meeting #93, Tdoc: R1-1806058 (Year: 2018).*
Vivo et al., Discussion on DCI format for URLLC, May 21, 2018, 3GPP, 3GPP TSG RAN WG1 Meeting #93, Tdoc: R1-1806059 (Year: 2018).*
ZTE, Remaining issues on DCI content, May 21, 2018, 3GPP, 3GPP TSG RAN WG1 Meeting #92bis, Tdoc: R1-1806130 (Year: 2018).*
CMCC, Discussion on support of compact DCI for URLLC, May 21, 2018, 3GPP, 3GPP TSG RAN WG1 Meeting #93, Tdoc: R1-1806365 (Year: 2018).*
Intel Corporation, NR URLLC: DCI formats, May 21, 2018, 3GPP, 3GPP TSG RAN WG1 Meeting #93, Tdoc: R1-1806518 (Year: 2018).*

* cited by examiner

BASE STATION AND USER EQUIPMENT FOR MOBILE COMMUNICATION SYSTEM

PRIORITY

This application claims priority to U.S. Provisional Patent Application No. 62/715,297 filed on Aug. 7, 2018, which is hereby incorporated by reference in its entirety.

FIELD

The present invention relates to a base station (BS) and a user equipment (UE) for a mobile communication system. More particularly, the BS can configure multiple physical uplink control channel (PUCCH) resources with respect to different service types in the same slot so that the UE is able to transmit the uplink control signals on their corresponding PUCCH resources, respectively, in response to the different service types.

BACKGROUND

With the rapid development of wireless communication technologies, wireless communication has found wide application in people's life, and people's demand for wireless communication is increasing. The next generation of mobile communication system (which is generally referred to as the 5G mobile communication system currently) has proposed new service types, e.g., Ultra-reliable and Low Latency Communication (URLLC), Enhanced Mobile Broadband (eMBB) communication, and Massive Machine Type Communication (mMTC).

According to the current planning of the 5G mobile communication system, for downlink data signals respectively transmitted on the multiple physical downlink shared channel (PDSCH) resources, the base station (BS) would configure a single physical uplink control channel (PUCCH) resource in a slot for the user equipment (UE) to transmit the hybrid automatic repeat request acknowledgement (HARQ-ACK) message to report whether these downlink data signals are correctly received. However, regardless of what kind of service types these downlink data signals are transmitted for, the UE must collect the decoding results of these downlink data signals and report the decoding results through a single PUCCH resource in a slot according to the instructions from the BS. Under such circumstances, the decoding result of the downlink data signals with respect to the URLLC service should be reported together with the decoding result of the downlink data signals with respect to the eMBB service by being transmitted on the same PUCCH resource. As a result, the prior art cannot meet the low latency requirement of the URLLC service.

In addition, since the decoding results of the downlink data signals are reported together by being transmitted on a single PUCCH resource in a slot, the PUCCH format of the PUCCH resource will thus be limited. In other words, the selection of the PUCCH format (e.g., the number of bits, the available code rate, etc.) in the prior art should depend upon both of the downlink data signals with respect to the URLLC service and the downlink data signals with respect to the eMBB service, and could not further take the two service types with different priorities into consideration to provide differential transmissions. As a result, the prior art also cannot meet the ultra-reliable requirement of the URLLC service.

Accordingly, an urgent need exists in the art to provide a resource configuration mechanism to configure the required resources in response to the transmission requirements of the different service types to make the utilization of the PUCCH resources flexible to meet the ultra-reliable and low latency requirement of the URRLC service.

SUMMARY

An objective of the present invention is to provide a resource configuration mechanism, which defines the slot as being constituted by a first number of the first type sub-slots based on a first service type and as being constituted by a second number of the second type sub-slots based on a second service type so as to make the BS able to configure two independent PUCCH resources in the same slot according to the different service types. By this way, for the decoding results of the downlink data signals with respect to the different service types, the UE is able to transmit the HARQ-ACK messages on the corresponding PUCCH resources, respectively. Therefore, the resource configuration mechanism of the present invention is able to configure the required PUCCH resources in response to the transmission requirements of the different service types to make the utilization of the PUCCH resources flexible to meet the ultra-reliable and low latency requirement of the URRLC service.

The disclosure includes a base station (BS) for a mobile communication system. The BS comprises a transceiver and a processor. The processor electrically connected to the transceiver, being configured to execute the following operations: generating first downlink information (DCI) with respect to a first service type; transmitting the first DCI on a first physical downlink control channel (PDCCH) resource to a user equipment (UE) via the transceiver, the first DCI indicating a first physical downlink shared channel (PDSCH) resource and a first physical uplink control channel (PUCCH) resource, the first PUCCH resource being used by the UE for transmitting a first hybrid automatic repeat request acknowledgement (HARQ-ACK) message, the first HARQ-ACK message being used for indicating whether a first downlink data signal carried on the first PDSCH resource is received correctly by the UE; generating second DCI with respect to a second service type; and transmitting the second DCI on a second PDCCH resource to the UE via the transceiver, the second DCI indicating a second PDSCH resource and a second PUCCH resource, the second PUCCH resource being used by the UE for transmitting a second HARQ-ACK message, the second HARQ-ACK message being used for indicating whether a second downlink data signal carried on the second PDSCH resource is received correctly by the UE. A first starting symbol of the first PUCCH resource is located within a first type assigned sub-slot of a plurality of first type sub-slots of a slot, and a second starting symbol of the second PUCCH resource is located within a second type assigned sub-slot of a plurality of second type sub-slots of the slot. The slot is defined as being constituted by a first number of the first type sub-slots and defined as being constituted by a second number of the second type sub-slots. Each of the first type sub-slots is defined as having at least one first available PUCCH resource set, and each of the second type sub-slots is defined as having at least one second available PUCCH resource set. The first PUCCH resource is one of a plurality of PUCCH resources in a first PUCCH resource set of the at least one first available PUCCH resource set, and a starting symbol of each of the PUCCH resources in the first PUCCH resource set is located within the first type assigned sub-slot. The second PUCCH resource is one of a plurality of PUCCH resources in a second PUCCH resource set of the at least one second available PUCCH resource set, and a starting symbol of each of the PUCCH resources in the second PUCCH resource set is located within the second type assigned sub-slot. The first service type and the second service type have different priorities.

The disclosure also includes a user equipment (UE) for a mobile communication system. The UE comprises a transceiver and a processor. The processor electrically connected to the transceiver, being configured to execute the following operations: receiving first downlink control information (DCI) on a first physical downlink control channel (PDCCH) resource from a base station (BS) via the transceiver, the first DCI indicating a first physical downlink shared channel (PDSCH) resource and a first physical uplink control channel (PUCCH) resource, the first PUCCH resource being used by the UE for transmitting a first hybrid automatic repeat request acknowledgement (HARQ-ACK) message, the first HARQ-ACK message being used for indicating whether a first downlink data signal carried on the first PDSCH resource is received correctly by the UE; and receiving second DCI on a second PDCCH resource from the BS via the transceiver, the second DCI indicating a second PDSCH resource and a second PUCCH resource, the second PUCCH resource being used by the UE for transmitting a second HARQ-ACK message, the second HARQ-ACK message being used for indicating whether a second downlink data signal carried on the second PDSCH resource is received correctly by the UE. A first starting symbol of the first PUCCH resource is located within a first type assigned sub-slot of a plurality of first type sub-slots of a slot, and a second starting symbol of the second PUCCH resource is located within a second type assigned sub-slot of a plurality of second type sub-slots of the slot. The slot is defined as being constituted by a first number of the first type sub-slots and defined as being constituted by a second number of the second type sub-slots. Each of the first type sub-slots is defined as having at least one first available PUCCH resource set, and each of the second type sub-slots is defined as having at least one second available PUCCH resource set. The first PUCCH resource is one of a plurality of PUCCH resources in a first PUCCH resource set of the at least one first available PUCCH resource set, and a starting symbol of each of the PUCCH resources in the first PUCCH resource set is located within the first type assigned sub-slot. The second PUCCH resource is one of a plurality of PUCCH resources in a second PUCCH resource set of the at least one second available PUCCH resource set, and a starting symbol of each of the PUCCH resources of the second PUCCH resource set is located within the second type assigned sub-slot. The first DCI corresponds to a first service type, the second DCI corresponds to a second service type, and the first service type and the second service type have different priorities.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. These example embodiments are not intended to limit the present invention to any particular examples, embodiments, environment, applications or implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

The first embodiment of the present invention is as shown in FIGS. 1A-1B and 2A-2B. In this embodiment, for simplification of the description, only the signal transmissions between a single UE 2 and a BS 1 connected thereto are depicted as the examples to describe how the BS 1 decides the definitions of the sub-slots and configures the uplink resources for different service types with different priorities. The components and the functions of the components relevant to the BS 1 and UE 2 will be further described in the embodiments corresponding to FIG. 5 and FIG. 6. It shall be shall be appreciated by those of ordinary skill in the art that the BS 1 can also perform the signal transmissions with other UEs and executes the same transmission operations with the other UEs, and thus it will not be further described herein.

The BS 1 is adapted for a wireless communication which may be the next generation of mobile communication system (broadly called 5G mobile communication system currently) or any mobile communication systems based on the orthogonal frequency division multiple access (OFDMA) technology. The following description is based on the 5G mobile communication system to illustrate the present invention; however, how to extend the technical means of the present invention to be applied to other OFDMA-based mobile communication systems shall be appreciated by those of ordinary skill in the art, and thus will be not further described herein.

The BS 1 in the 5G mobile communication system is usually called a "gNB." In the mobile communication system of the present application, the slots may further be defined according to different service types having different priories (e.g., as compared with the eMBB service, the URLLC service has a higher priority). Specifically, for the eMBB service, the slot may be defined as being constituted by a first number of first type sub-slots, and for the URLLC service, and the slot may be defined as being constituted by a second number of second type sub-slots. The values of the first and second numbers have various options provide by the mobile communication system for the BS 1 to configure them based on the requirements in practice.

Figure 1A:
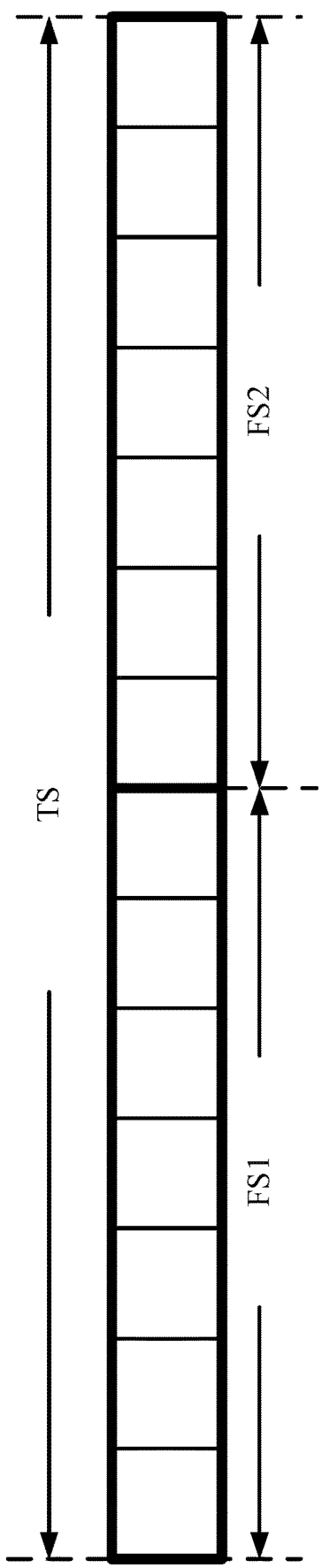
FIGS. 1A-1B depict the definitions of sub-slots according to the present invention.
Figure 1B:
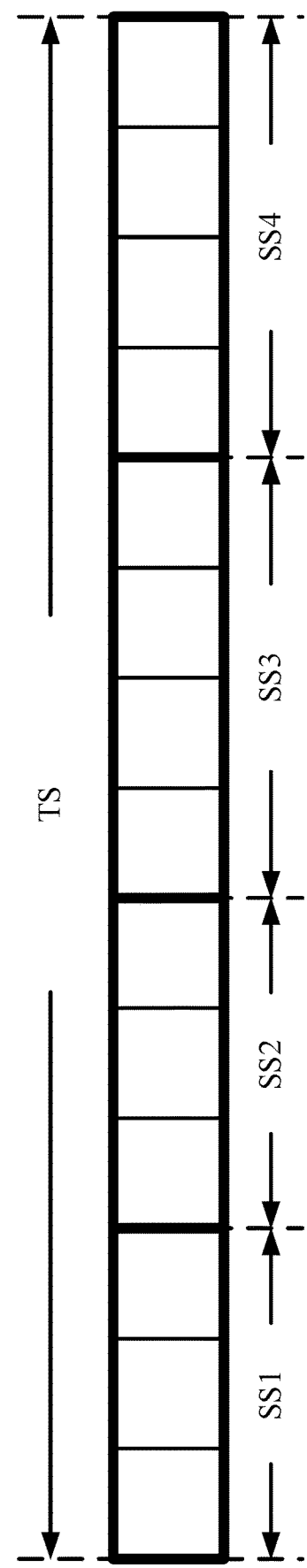

For example, taking a slot having 14 OFDM symbols for illustration, as shown in FIGS. 1A-1B. In FIG. 1A, it is assumed that the first service type is the eMBB service with higher tolerance to transmission latency. Thus, for the eMBB service, the BS 1 may configure the slot as being constituted by two first type sub-slots FS1, FS2, where the first type sub-slots FS1, FS2 occupy seven OFDM symbols, respectively (but not limited thereto). In addition, in FIG. 1B, it is assumed that the second service type is the URLLC service with low latency and high reliability requirements. Thus, for the URLLC service, the BS 1 may configure the slot as being constituted by four second type sub-slots SS1-SS4, where the second type sub-slots SS1, SS2 occupy three OFDM symbols, respectively, and the second type sub-slots SS3, SS4 occupy four OFDM symbols, respectively, (but not limited thereto). In other words, the BS 1 determines the definitions of the slot according to the requirements in practice as this embodiment in which the slot is defined as being constituted by the two first type sub-slots and as being constituted by the four second type sub-slots. It shall be noted that as restricted by the paper layout, only one slot is depicted in FIGS. 1A-1B; however, those of ordinary skill in the art could understand that other slots may have the same definition as well.

Figure 2A:
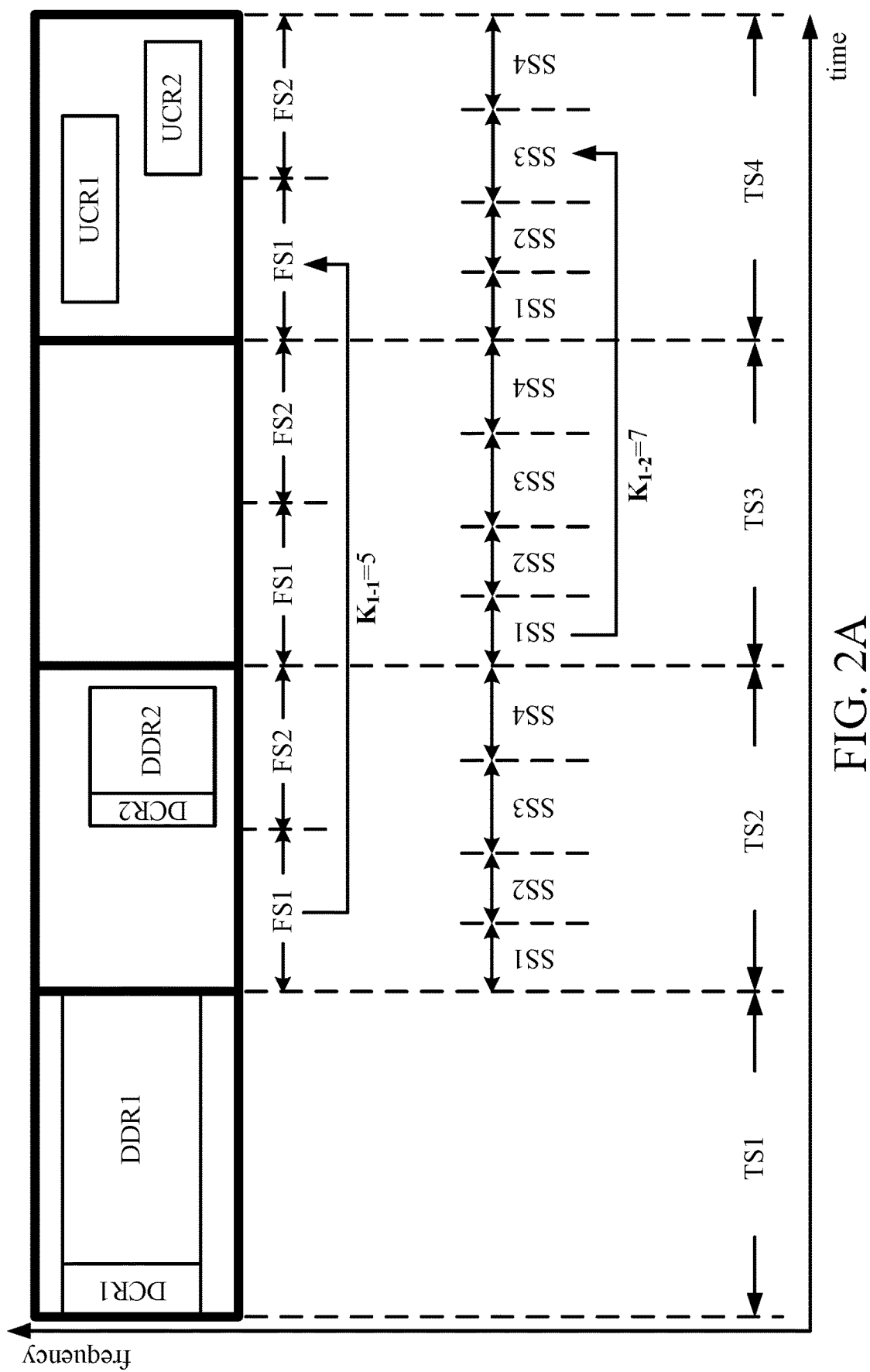
FIGS. 2A-2B depict schematic views of uplink resource configurations according to the present invention.

As shown in FIG. 2A, in this embodiment, the BS 1 generates first DCI (not shown), with respect to the first service type, indicating a first PDSCH resource DDR1 and a first PUCCH resource UCR1. Afterwards, the BS 1 transmits the first DCI on a first PDCCH resource DCR1 to the UE 2. The first PUCCH resource UCR1 is used by the UE 2 for transmitting a first HARQ-ACK message used for indicating whether a first downlink data signal (not shown) carried on the first PDSCH resource DDR1 is received correctly by the UE 2.

Besides, the BS 1 further generates second DCI (not shown), with respect to the second service type, indicating a second PDSCH resource DDR2 and a second PUCCH resource UCR2. Next, the BS 1 transmits the second DCI on a second PDCCH resource DCR2 to the UE 2. The second PUCCH resource UCR2 is used by the UE 2 for transmitting a second HARQ-ACK message used for indicating whether a second downlink data signal (not shown) carried on the second PDSCH resource DDR2 is received correctly by the UE 2. It shall be noted that in order to make the figures simple and easily read without affecting the description of the present invention, the first DCI, the first downlink data signal, the second DCI, and the second downlink data signal are omitted from depiction and not shown in the figures.

In this embodiment, the first PUCCH resource UCR1 and the second PUCCH resource URC2 are located within the same slot. In other words, different from the prior art which can only configure a single PUCCH resource within one slot for the UE to transmit an HARQ-ACK message, the present invention can configure multiple PUCCH resources within one slot for the UE to transmit HARQ-ACK messages, especially transmitting the HARQ-ACK messages on the different PUCCH resources, respectively, in response to the downlink data signals with respect to different service types. A first starting symbol of the first PUCCH resource UCR1 is located within a first type assigned sub-slot (i.e., the first type sub-slot FS1 in the slot TS4 in this embodiment) of the first type sub-slots FS1, FS2 in the slot TS4, and a second starting symbol of the second PUCCH resource UCR2 is located within a second type assigned sub-slot (i.e., the second type sub-slot SS3 in the slot TS4 in this embodiment) of the second type sub-slots SS1, SS2, SS3, SS4 of the slot TS4.

Each of the first type sub-slots FS1, FS2 of the slot TS4 is defined as having at least one first available PUCCH resource set, and the first PUCCH resource UCR1 is one of a plurality of PUCCH resources in a first PUCCH resource set of the at least one first available PUCCH resource set. The starting symbol of each of the PUCCH resources in the first PUCCH resource set is located within the first type assigned sub-slot (i.e., within the first type sub-slot FS1 of the slot TS4). Each of the second type sub-slots SS1, SS2, SS3, SS4 of the slot TS4 is defined as having at least one second available PUCCH resource set, and the second PUCCH resource UCR2 is one of a plurality of PUCCH resources in a second PUCCH resource set of the at least one second available PUCCH resource set. The starting symbol of each of the PUCCH resources of the second PUCCH resource set is located within the second type assigned sub-slot (i.e., within the second type sub-slot SS3 of the slot TS4).

Specifically, the PUCCH resources in each first available PUCCH set have different sets of parameters from each other, and the PUCCH resources in each second available PUCCH set have different sets of parameters from each other. The parameters, for instance, may include the PUCCH ID, the starting physical resource block (PRB), the PUCCH format, etc. The configuration of each PUCCH resource in each first available PUCCH resource set and in each second available PUCCH resource set may refer to the description of the PUCCH configuration in the section 6.3.2 of 3GPP TS 38.331 specification (but not limited thereto). However, it shall be emphasized that in the present invention, each PUCCH resource set (i.e., each first available PUCCH resource set and each second available PUCCH resource set) and the PUCCH resources therein are configured based on the sub-slot (i.e., the first type sub-slot or the second type sub-slot) so that the starting symbols of the PUCCH resources in each PUCCH resource set are located within the same sub-slot, but the length of each PUCCH resource is not limited to the length of a sub-slot (i.e., one PUCCH resource may be configured over two or more sub-slots).

In addition, the sets of the configuration parameters of the PUCCH resources in each first available PUCCH resource set are independent of the sets of the configuration parameters of the PUCCH resources in each second available PUCCH resource set. Thus, the PUCCH resources in the first PUCCH resource set may have the same PUCCH formats as or different PUCCH formats from the PUCCH resources in the second PUCCH resource set. Moreover, the PUCCH formats of the PUCCH resources in the first PUCCH resource set may have the same maximum code rates as or different maximum code rates from the PUCCH formats of the PUCCH resources in the second PUCCH resource set. It shall be noted that regarding the aforementioned configurations of the first type sub-slots FS1-FS2, the second type sub-slots SS1-SS4, the first available PUCCH resource sets, the second available PUCCH resource sets, and the PUCCH resources therein, the BS 1 may inform the UE 2 of them by the higher layer signaling, e.g., the radio resource control (RRC) message.

In the present invention, when generating the DCI, the BS 1 may inform the UE 2 of the service type to which the currently received DCI belongs to. For example, when generating the first DCI and the second DCI, the BS 1 may use different radio network temporary identifiers (RNTIs) for the scrambling operations to the first DCI and the second DCI, respectively. Thus, the first DCI has a first cyclic redundancy check (CRC), and the second DCI has a second CRC, where the first CRC and the second CRC are scrambled by the first RNTI and the second RNTI, respectively. Under such circumstances, the UE 2 can use different RNTIs to blindly decode the first DCI and the second DCI to identify that the first DCI belongs to the first service type and the second DCI belongs to the second service type. In this example, when UE 2 establishes a connection with the BS 1, the BS 1 will assign an RNTI to the UE 2, and when the UE 2 would like to activate both the eMBB and URLLC services, the BS 1 would take the originally-assigned RNTI as used in the eMBB service and assign another URLLC-RNTI for use in the URLLC service (but not limited thereto).

In another example, the BS 1 may transmit the first DCI and second DCI through different control resource sets (CORSETs) or different search space so as to use the first PDCCH resource DCR1 and the second PDCCH resource DCR2 with different time-frequency positions to carry the first DCI and second DCI for the UE 2 to identify that the first DCI belongs to the first service type and the second DCI belongs to the second service type.

In another example, the BS 1 may make the first DCI and the second DCI include different service type indicators so as to inform the UE 2 directly about what kind of service type each of the first DCI and second DCI belongs to individually via the value of extra bit(s). Under such circumstances, the UE 2 is able to identify that the first DCI belongs to the first service type and the second DCI belongs to the second service type according to the service type indicators.

In another example, the BS 1 may make the first DCI and the second DCI have different format with different numbers of bits. By this way, the UE 2 is able to identify that the first DCI belongs to the first service type and the second DCI belongs to the second service type according to the bit sizes of the first DCI and the second DCI. In this example, the BS 1 may use the DCI with fewer bits for the URLLC service, and use the DCI with the normal number of bits for the eMBB service. In other words, the DCI for used in the URLLC service has the less number of bits than the DCI for used in the eMBB service.

Figure 2B:
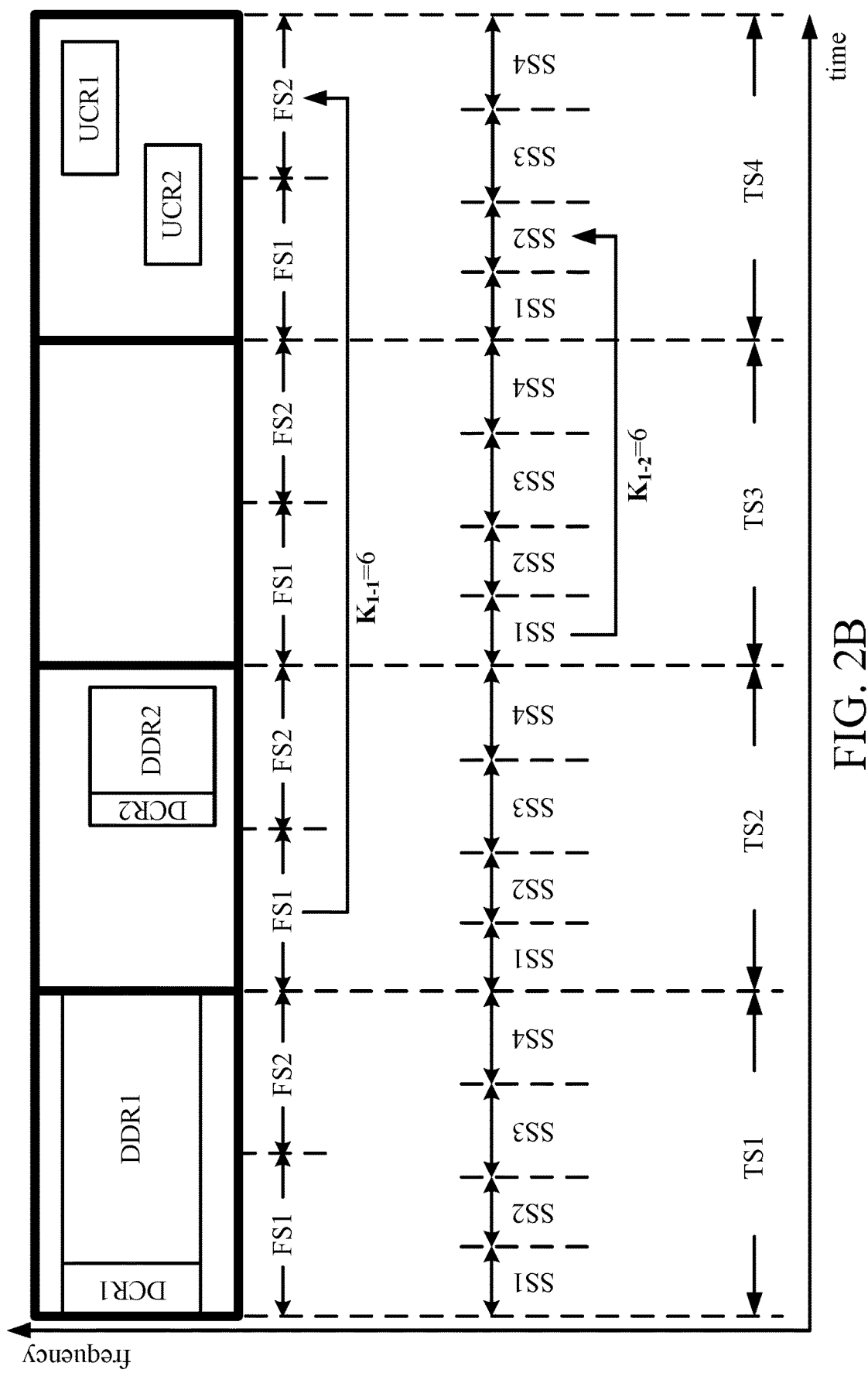

The second embodiment of the present invention is as shown in FIGS. 2A-2B. The second embodiment is an extension of the first embodiment. In addition to informing the UE 2 about the service type of the currently received DCI, the BS 1 further informs the UE 2 about which sub-slot the corresponding PUCCH resource is located in via the DCI including the HARQ feedback timing indicator when configuring the PUCCH resource. In details, the HARQ feedback timing indicator has a value mapping a PUCCH resource to an assigned sub-slot. The value of the HARQ feedback timing indicator is selected from a feedback timing set which includes a plurality of values and each value represents a sub-slot offset of a number of the sub-slots for mapping to the assigned sub-slot. After receiving the DCI, the UE 2 counts the required sub-slots from the sub-slot next to the last sub-slot in which the downlink data signal is completely received up to the sub-slot offset according to the value of the HARQ feedback timing indicator, and thus get the sub-slot which the PUCCH resource is located in.

As mentioned in the first embodiment, the BS 1 can define the slot TS as being constituted by the different numbers of sub-slots according to the transmission requirements of each service type, and configure the PUCCH resource of the corresponding service type for the UE 2 to transmit the HARQ-ACK message. Likewise, the value of the HARQ feedback timing indicator included in each different DCI is selected from the corresponding feedback timing set, and such feedback timing set can correspond to the service type of the DCI.

In this embodiment, the first DCI includes a first HARQ feedback timing indicator $K_{1-1}$, and a first value of the first HARQ feedback indicator $K_{1-1}$ maps the first PUCCH resource UCR1 to the first type assigned sub-slot (i.e., the first type sub-slot FS1 in the slot TS4). The first value of the first HARQ feedback indicator $K_{1-1}$ is selected from a first feedback timing set, and each of a plurality values in the first feedback timing set represents a sub-slot offset of the number of the first type sub-slots for mapping to the first type assigned sub-slot. The second DCI includes a second HARQ feedback timing indicator $K_{1-2}$, and a second value of the second HARQ feedback indicator $K_{1-2}$ maps the second PUCCH resource UCR2 to the second type assigned sub-slot (i.e., the second type sub-slot SS3 in the slot TS4). The second value of the second HARQ feedback timing indicator $K_{1-2}$ is selected from a second feedback timing set, and each of a plurality values in the second feedback timing set represents a sub-slot offset of a number of the second type sub-slots for mapping to the second type assigned sub-slot.

For example, please refer to FIG. 2A which depicts the uplink resource configurations of the first PUCCH resource UCR1 and the second PUCCH resource UCR2. It is assumed that the first service type corresponding to the first DCI is the eMBB service, so each slot could be treated as constituted by two first type sub-slots FS1, FS2. The BS 1 transmit the first DCI on the first PDCCH resource DCR1 in the slot TS1, and the first value of the first HARQ feedback timing indicator $K_{1-1}$ included in the first DCI is 5. The first value "5" means that the first type assigned sub-slot (i.e., the first type sub-slot FS1 in the slot TS4) is the $5^{th}$ first type sub-slot of the first service type from the first type sub-slot (i.e., the first type sub-slot FS1 in the slot TS2) next to the last first type sub-slot of the first PDSCH resource DDR1 (after the reception of the first downlink data signal).

It is assumed that the second service type corresponding to the second DCI is the URLLC service, so each slot could be treated as constituted by four second type sub-slots SS1, SS2, SS3, SS4. The BS 1 transmits the second DCI on the second PDCCH resource DCR2 in the slot TS2, and the second value of the second HARQ feedback timing indicator $K_{1-2}$ included in the second DCI is 7. The second value "7" means that the second type assigned sub-slot (i.e., the second type sub-slot SS3 in the slot TS4) is the $7^{th}$ second type sub-slot of the second service type from the second type sub-slot (i.e., the second type sub-slot SS1 in the slot TS3) next to the last second type sub-slot of the second PDSCH resource DDR2 (after the reception of the second downlink data signal).

In another example as referring to FIG. 2B, it depicts the uplink out-of-order configurations of the first PUCCH resource UCR1 and the second PUCCH resource UCR2. Since the URLLC service is mainly used for the vehicle communication, the industrial control and any applications having high reliable and low latency transmission requirement, if the BS 1 configures the second PUCCH resource UCR2 with respect to the URLLC service in order based on the prior art, then the timing that the UE 2 is able to transmit the feedback message relevant to the URLLC service at the earliest will incur high latency. As a result, in order to meet the URLLC service requirement, even though the second PDSCH resource DDR2 is configured to be after the first PDSCH resource DDR1 in the time domain, the BS 1 is able to configure the second PUCCH resource UCR2 to be advanced to the first PUCCH resource UCR1 based on the uplink out-of-order configuration to make the UE 2 able to preferentially process the second downlink data signal on the second PDSCH resource DDR2 and transmit the feedback of the processing result to the BS 1 within the shortest possible time after the finish of processing the second downlink data signal.

In FIG. 2B, the first value of the first HARQ feedback timing indicator $K_{1-1}$ included in the first DCI is 6. The first value "6" means that the first type assigned sub-slot (i.e., the first type sub-slot FS2 in the slot TS4) is the $6^{th}$ first type sub-slot of the first service type from the first type sub-slot (i.e., the first type sub-slot FS1 in the slot TS2) next to the last first type sub-slot of the first PDSCH resource DDR1. Likewise, the second value of the second HARQ feedback timing indicator $K_{1-2}$ included in the second DCI is 6. The second value "6" means that the second type assigned sub-slot (i.e., the second type sub-slot SS2 in the slot TS4) is the $6^{th}$ second type sub-slot of the second service type from the second type sub-slot (i.e., the second type sub-slot SS1 in the slot TS3) next to the last second type sub-slot of the second PDSCH resource DDR2.

It can be seen from the above description that the value of the HARQ feedback timing indicator with respect to the eMBB service and the value of the HARQ feedback timing indicator with respect to the URLLC service in the present invention represent different scales, where the former represents the sub-slot offset in how many first type sub-slots, and the latter represent the sub-slot offset in how many second type sub-slot. It shall be noted that the calculation for the position of the mapped sub-slot based on the value of the HARQ feedback timing indicator included in the DCI as described above is only for purpose of illustration. Thus, in other embodiments, the UE 2 may alternatively take the sub-slot of the next scheduled uplink resource after the end of the PDSCH resource as the starting sub-slot (but not limited thereto). Based on the above description, those of ordinary skill in the art can understand that the basis of the starting sub-slot for calculating the position of the PUCCH resource may be chosen according to the practical operation, and thus it will not be further described herein Besides, in another embodiment, each of the first PDSCH resource DDR1 and the second PDSCH resource DDR2 may be a semi-persistent scheduling (SPS) resource. In other words, the BS 1 may pre-configure the periodic PDSCH resources in advance in response to some implementation scenarios (e.g., having low latency transmission requirement or having periodicity of data transmission).

Besides, in another embodiment, the UE 2 may determine whether an overlapped part exists between the first PUCCH resource UCR1 and the second PUCCH resource UCR2. When the overlapped part does not exist between the first PUCCH resource UCR1 and the second PUCCH resource UCR2, the UE 2 transmits the first HARQ-ACK message on the first PUCCH resource UCR1 and the second HARQ-ACK message on the second PUCCH resource UCR2 to the BS 1. However, when the overlapped part exists between the first PUCCH resource UCR1 and the second PUCCH resource UCR2, if the priority of the second service type (e.g., the URLLC service) which the second HARQ-ACK message corresponds to is higher than the priority of the first service type (e.g., eMBB service) which the first HARQ-ACK message corresponds to, then for the overlapped part, the UE 2 only transmits the second HARQ-ACK message on the second PUCCH resource UCR2 to the BS 1.

In other words, if the BS 1 configures the second PUCCH resource UCR2 with respect to the URLCC service to have the overlapped part with the first PUCCH resource UCR1 with respect to the eMBB service based on the scheduling request for emergency, the UE 2 will preferentially transmit the second HARQ-ACK message with respect to the URLLC service on the second PUCCH resource UCR2. As for the first HARQ-ACK message with respect to the eMBB service, the UE 2 can choose not to transmit the first HARQ-ACK message or transmit part of the first HARQ-ACK message on the part, which does not overlapped with the second PUCCH resource UCR2, of the first PUCCH resource UCR1. The BS 1 may inform the UE 2 about how to deal with the transmission of the first HARQ-ACK message by the higher layer signaling, e.g., the RRC message.

Besides, in another embodiment, when the overlapped part exists between the first PUCCH resource UCR1 and the second PUCCH resource UCR2, if the priority of the second service type (e.g., the URLLC service) which the second HARQ-ACK message corresponds to is higher than the priority of the first service type (e.g., eMBB service) which the first HARQ-ACK message corresponds to, then for the overlapped part, the UE 2 not only transmits the second HARQ-ACK message on the second PUCCH resource UCR2, but also transmits the first HARQ-ACK message on the second PUCCH resource UCR2. In other words, in response to the existence of the overlapped part, the UE 2 can integrate the HARQ-ACK message (i.e., the first HARQ-ACK message) corresponding to the lower priority with the HARQ-ACK message (i.e., the second HARQ-ACK message) corresponding to the higher priority, and transmit them on the PUCCH resource (i.e., the second PUCCH resource UCR2) corresponding to the higher priority.

It shall be noted that the BS 1 can inform the UE 2 about the priority of each service type by the higher layer signaling, e.g., the RRC message, so that after receiving the DCI and identifies its service type, the UE 2 can learn about the corresponding priority. Besides, in the case that the communication system or the BS 1 does not pre-define the priority of each service type, the later received DCI implicitly has the higher priority.

Figure 3:
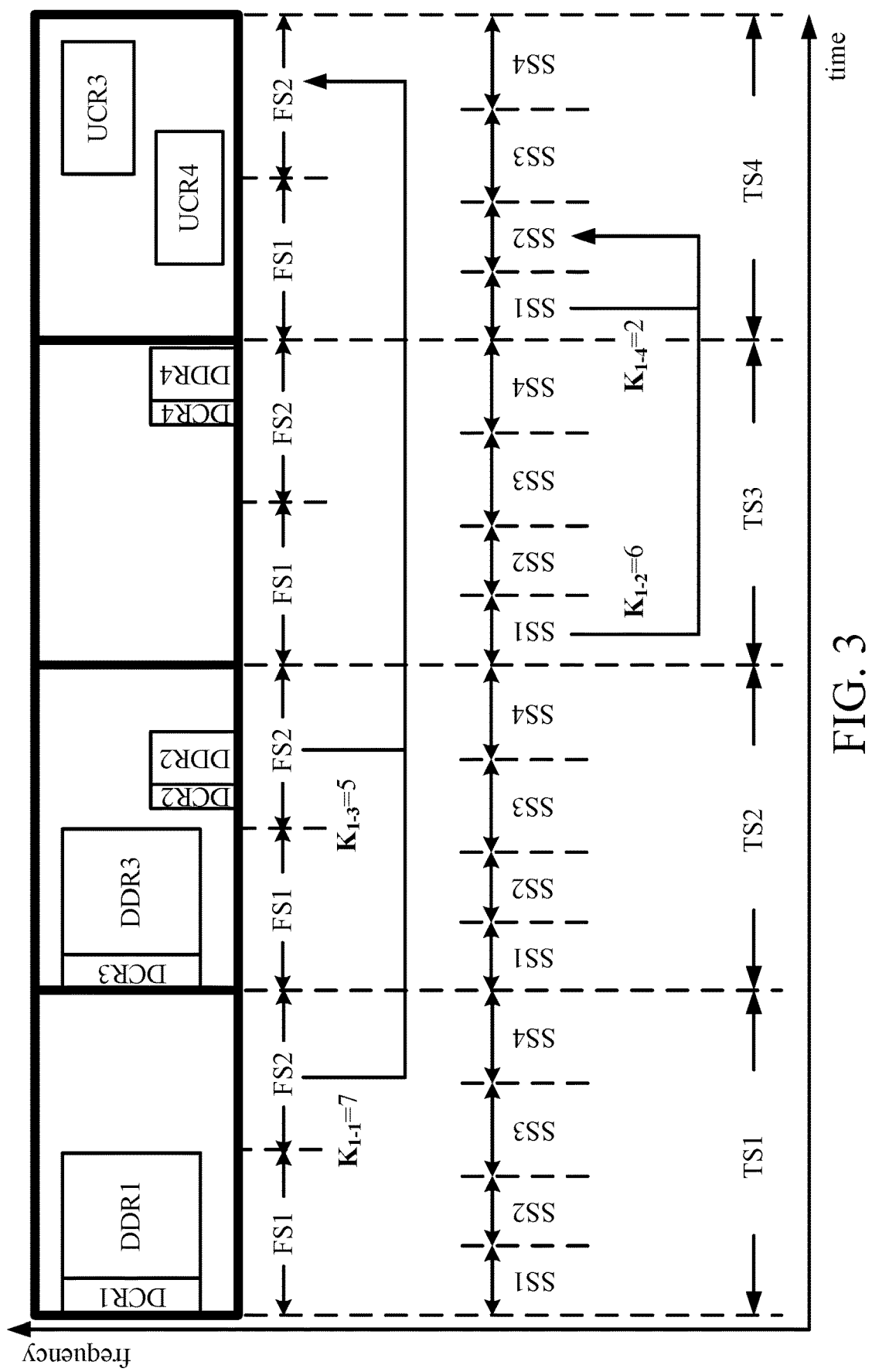
FIG. 3 depicts a schematic view of an uplink resource configurations according to the present invention.

The third embodiment of the present invention is as shown in FIG. 3. The third embodiment is an extension of the first embodiment. In this embodiment, the BS 1 further generates third DCI, with respect to the first service type, indicating a third PDSCH resource DDR3 and a third PUCCH resource UCR3, and transmits the third DCI on a third PDCCH resource DCR3 to the UE 2. The third DCI includes a third HARQ feedback timing indicator $K_{1-3}$ as well. A third value of the third HARQ feedback indicator $K_{1-3}$ maps the third PUCCH resource UCR3 to the first type assigned sub-slot (i.e., the first type sub-slot FS2 in the slot TS4), and the third value is also selected from the first feedback timing set. The third PUCCH resource UCR3 is used by the UE 2 for transmitting the first HARQ-ACK message. In addition to indicating whether the first downlink data signal carried on the first PDSCH resource DDR1 is received correctly by the UE 2, the first HARQ-ACK message further indicates whether the third downlink data signal carried on the third PDSCH resource DDR3 is received correctly by the UE 2. The first PUCCH resource UCR1 and the third PUCCH resource UCR3 belong to the first PUCCH set, and the first PUCCH resource UCR1 may be identical or different to the third PUCCH resource UCR3. When the third PUCCH resource UCR3 is different to the first PUCCH resource UCR1, the UE 2 transmits the first HARQ-ACK message on the third PUCCH resource UCR3.

Similarly, the BS 1 further generates fourth DCI, with respect to the second service type, indicating a fourth PDSCH resource DDR4 and a fourth PUCCH resource UCR4, and transmits the fourth DCI on a fourth PDCCH resource DCR4 to the UE 2. The fourth DCI includes a fourth HARQ feedback timing indicator $K_{1-4}$, and a fourth value of the fourth HARQ feedback indicator $K_{1-4}$ maps the fourth PUCCH resource UCR4 to the second type assigned sub-slot (i.e., the second type sub-slot SS2 in the slot TS4). Likewise, the fourth value is selected from the second feedback timing set. The fourth PUCCH resource UCR4 is used by the UE 2 for transmitting the second HARQ-ACK message. In addition to indicating whether the second downlink data signal carried on the second PDSCH resource DDR2 is received correctly by the UE 2, the second HARQ-ACK message further indicates whether the fourth downlink data signal carried on the fourth PDSCH resource DDR4 is received correctly by the UE 2. The second PUCCH resource UCR2 and the fourth PUCCH resource UCR4 belong to the second PUCCH set, and the second PUCCH resource UCR2 may be identical or different to the fourth PUCCH resource UCR4. When the fourth PUCCH resource UCR4 is different to the second PUCCH resource UCR2, the UE 2 transmits the second HARQ-ACK message on the fourth PUCCH resource UCR4.

For example, please refer to FIG. 3, the BS 1 sets the first value of the first HARQ feedback timing indicator $K_{1-1}$ included in the first DCI to 7 and sets the third value of the third HARQ feedback timing indicator $K_{1-3}$ included in the third DCI to 5 so as to map the first PUCCH resource UCR1 and the third PUCCH resource UCR3 to the first type sub-slot FS2 in the slot TS4.

In the meantime, the BS 1 sets the second value of the second HARQ feedback timing indicator $K_{1-2}$ included in the second DCI to 6 and sets the fourth value of the fourth HARQ feedback timing indicator $K_{1-4}$ included in the fourth DCI to 2 so as to map the second PUCCH resource UCR2 and the fourth PUCCH resource UCR4 to the second type sub-slot SS2 in the slot TS4

The fourth embodiment of the present invention please also refer to FIG. 3. The fourth embodiment is an extension of the third embodiment. In details, the first DCI further includes a first PUCCH resource indicator (PRI) used for indicating a first position of the first PUCCH resource UCR1 (i.e., the time-frequency position of the first PUCCH resource UCR1) of the first PUCCH resource set. The second DCI further includes a second PRI used for indicating a second position of the second PUCCH resource UCR2 (i.e., the time-frequency position of the second PUCCH resource UCR2) of the second PUCCH resource set. The third DCI further includes a third PRI used for indicating a third position of the third PUCCH resource UCR3 (i.e., the time-frequency position of the third PUCCH resource UCR3) of the first PUCCH resource set. The fourth DCI further includes a fourth PRI used for indicating a fourth position of the fourth PUCCH resource UCR4 (i.e., the time-frequency position of the fourth PUCCH resource UCR4) of the second PUCCH resource set.

For the downlink data signals with respect to the same service type, the UE 2 will transmit the HARQ-ACK message on the PUCCH resource whose position is indicated by the PRI included in the latest received DCI. Thus, for the first service type, the UE 2 transmits the first HARQ-ACK message on the third PUCCH resource UCR3, and for the second HARQ-ACK message, the UE 2 transmits the second HARQ-ACK message on the fourth PUCCH resource UCR4. Those of ordinary skill in the art can understand that if the first PRI and the third PRI are the same, it means that the first PUCCH resource UCR1 and the third PUCCH resource UCR3 are the same PUCCH resource, and if the second PRI and the fourth PRI are the same, it means that the second PUCCH resource UCR2 and the fourth PUCCH resource UCR4 are the same PUCCH resource. In practice, since the BS 1 may need to adjust the PUCCH resource used for transmitting the HARQ-ACK message in response to the change of the actual transmission condition, in such cases, the third PRI may be different from the first PRI and the fourth PRI may be different the second PRI. As a result, the UE 2 will transmit the first HARQ-ACK message on the third PUCCH resource UCR3 whose position is indicated by the third PRI included in the latest received third DCI, and transmit the second HARQ-ACK message on the fourth PUCCH resource UCR4 whose position is indicated by the fourth PRI included in the latest received fourth DCI.

In another embodiment, the first PUCCH resource UCR1 may be at least distributed in one of the first type sub-slots FS1, FS2 of the slot TS, and the second PUCCH resource UCR2 may be at least distributed in one of the second type sub-slots SS1, SS2, SS3, SS4 of the slot TS. In order to increase transmission reliability, for the same service type, the BS 1 can configure the repeated PUCCH resources for the UE2 to repeatedly transmit the same HARQ-message. These repeated PUCCH resources may be consecutive or spaced, and may be distributed in multiple sub-slots.

Based on the above description, when the BS 1 generates different pieces of DCI for the same service type, the BS 1 can assign the values of the HARQ feedback timing indicators to mapping the PUCCH resources indicted by every pieces of DCI to the same sub-slot, integrates the decoding results of the downlink data signals carried on the PDSCHs in the sub-slots, and reports them on one PUCCH resource. It shall be noted that as restricted by the paper layout, only two PDCCH resources and two PDSCH resources for the eMBB service are depicted in FIG. 3, and only two PDCCH resources and two PDSCH resources for the URLLC service are depicted in FIG. 3; however, those of ordinary skill in the art could understand that the number of the PDCCH resources and the number of the corresponding PDSCH resources in practice are not limited to the above example, and will vary according to the number of the sub-slots and the actual scheduling and allocation of the resources.

Figure 4A:
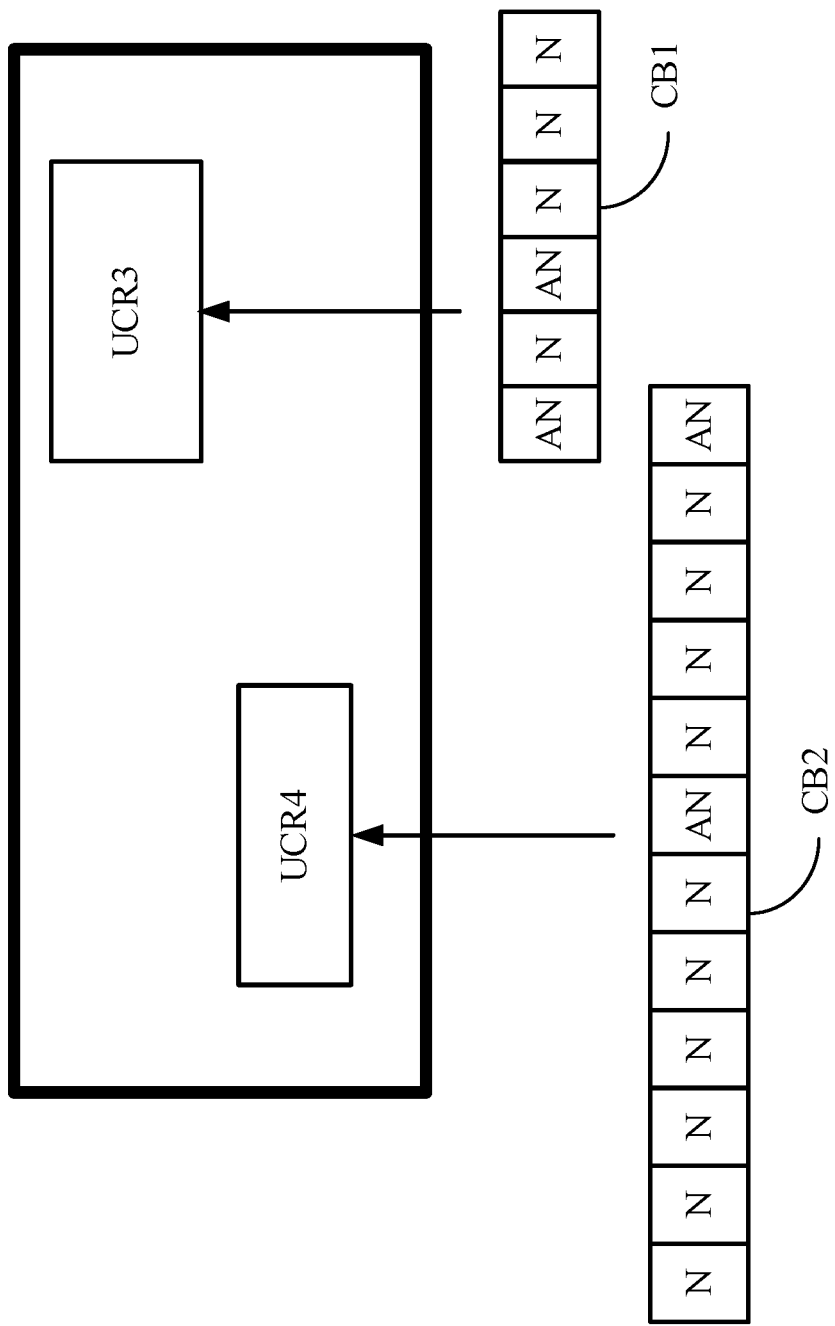
FIGS. 4A-4C depict each codebook type according to the present invention.
Figure 4B:
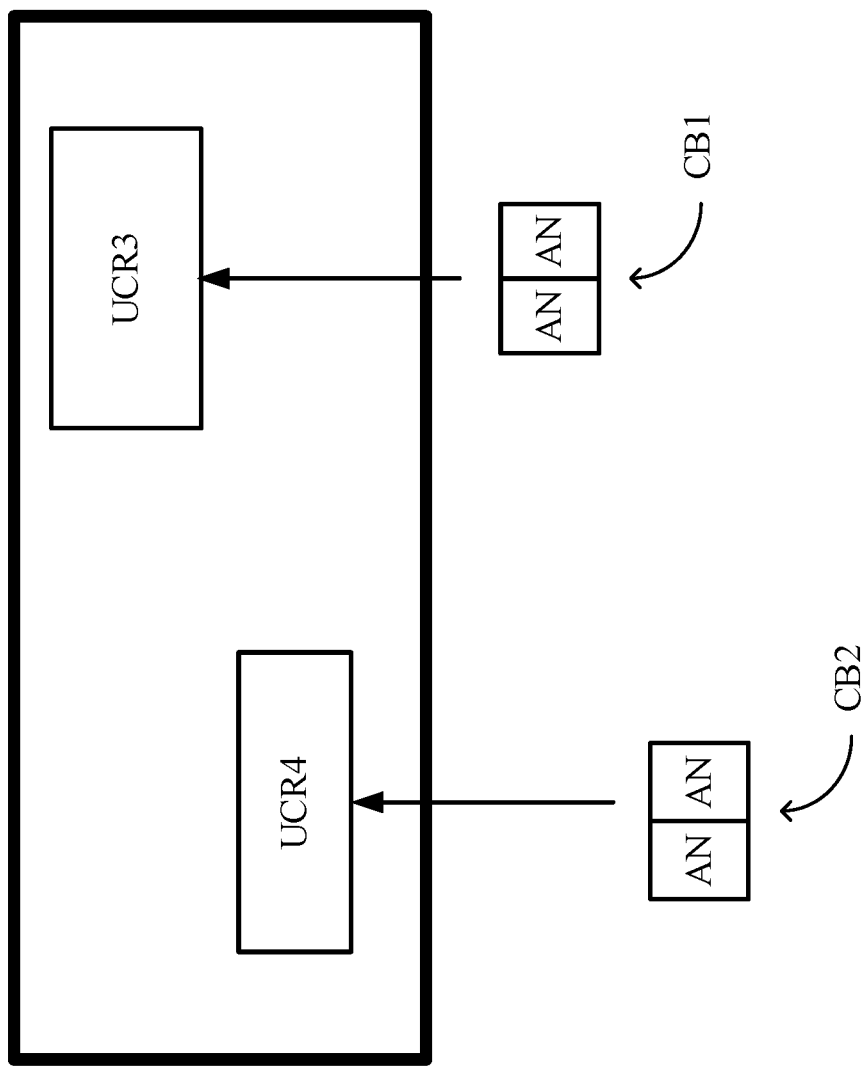
Figure 4C:
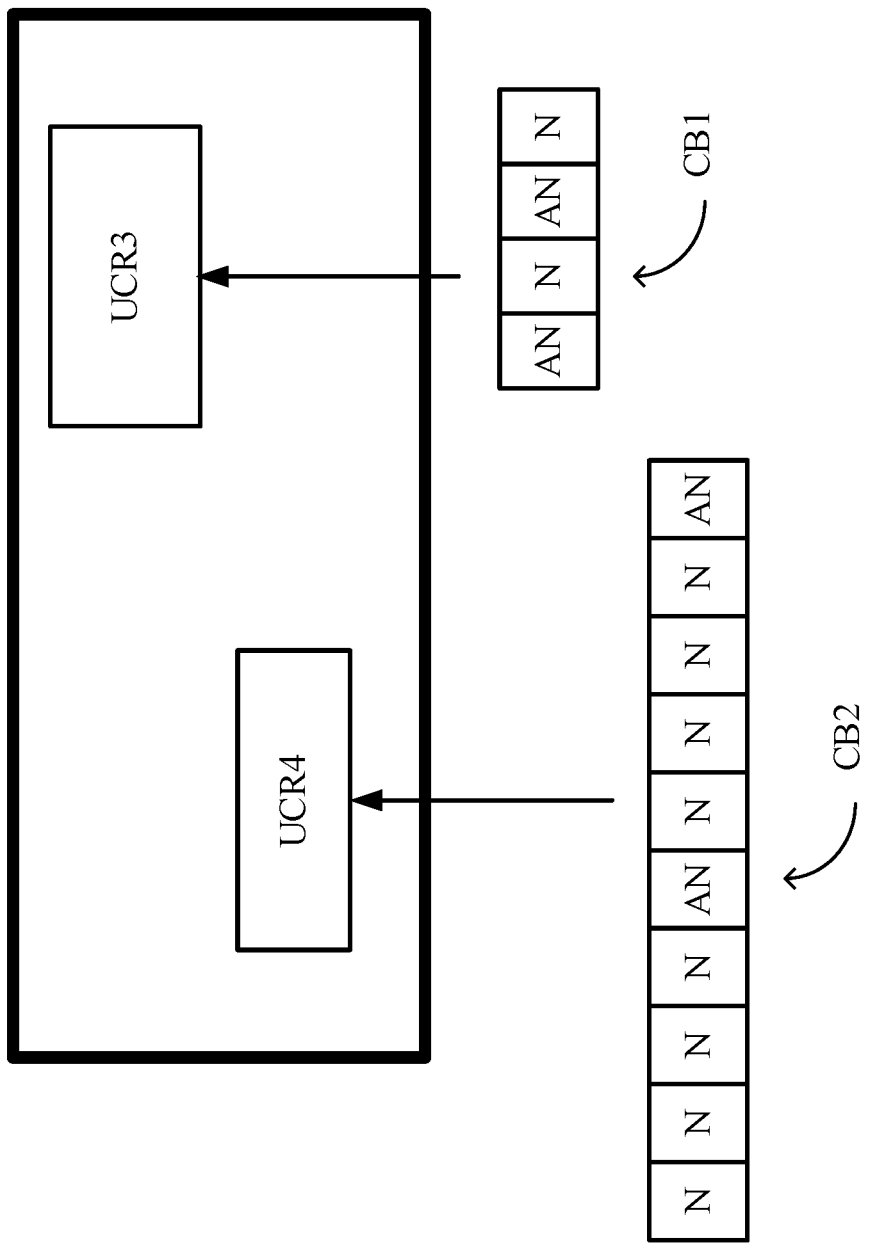

The fifth embodiment of the present invention is as shown in FIGS. 3 and 4A-4C. FIGS. 4A-4C depict each codebook type according to the present invention. In this embodiment, the PUCCH resources with respect to each of the first type sub-slots is configured with a first codebook type, and the PUCCH resource with respect to each of the second type sub-slots is configured with a second codebook type. The first HARQ-ACK message is generated in the form of a first codebook CB1 of the first codebook type, and the second HARQ-ACK message is generated in the form of a second codebook CB2 of the second codebook type. Each of the first codebook type and the second codebook type is one of a semi-static codebook type, a dynamic codebook type or a combination thereof.

For example, please refer to both FIG. 3 and FIG. 4A. In FIG. 4A, both of the first codebook type of the first codebook CB1 and the second codebook type of the second codebook CB2 are the semi-static codebook type. In this case, the data amount of the first codebook CB1 is associated with the number of the values (i.e., the number of elements) in the first feedback timing set, and the data amount of the second codebook CB2 is associated with the number of the values in the second feedback timing set. It shall be appreciated that it is assumed that each sub-slot only have a starting position of one PDSCH resource.

In details, as shown in FIG. 3, it is assumed that the number of the associated first type sub-slots which the UE 2 needs to integrate and report is six (i.e., the first type sub-slots in slots TS1-TS3) and the elements in the first feedback timing set are {2, 3, . . . , 7}, so the data amount of the first codebook CB1 in FIG. 4A is six pieces (e.g., six bits). According the receiving result of the first downlink data signal corresponding to the first type sub-slot FS1 in the TS1 and the receiving result of the third downlink data signal corresponding to the first type sub-slot FS1 in the slot TS2, the UE 2 reports decoding success (i.e., ACK) or decoding failure (i.e., NACK) in their corresponding bits in the first codebook CB1 as the bits labeled "AN" in the codebook CB1 in FIG. 4A. Besides, for other remaining sub-slots irrelevant to the downlink data signal with respect to the first service type, the UE 2 responds with NACKs in their corresponding bits as the bits labeled "N" in the codebook CB1 in FIG. 4A.

Similarly, as shown in FIG. 3, it is assumed that the number of the associated second type sub-slots which the UE 2 needs to integrate and report is 12 (i.e., the second type sub-slots in slots TS1-TS3) and the elements in the second feedback timing set are {2, 3, . . . , 13}, so the data amount of the second codebook CB2 in FIG. 4A is twelve pieces (e.g., twelve bits). According the receiving result of the second downlink data signal corresponding to the second type sub-slot FF3 in the TS2 and the receiving result of the fourth downlink data signal corresponding to the second type sub-slot FF4 in the slot TS3 the UE 2 reports decoding success (i.e., ACK) or decoding failure (i.e., NACK) in their corresponding bits in the second codebook CB2 as the bits labeled "AN" in the codebook CB2 in FIG. 4A. Besides, for other reminding sub-slots irrelevant to the downlink data signal with respect to the second service type, the UE 2 responds with NACKs in their corresponding bits as the bits labeled "N" in the codebook CB2 in FIG. 4A In another example, please refer to FIG. 4B in which both the first codebook type of the first codebook CB1 and the second codebook type of the second codebook CB2 are the dynamic codebook type. In this case, the data amount of the first codebook CB1 is associated with the number of the transmitted downlink data signals with respect to the first service type, and the data amount of the second codebook CB2 is associated with the number of the transmitted downlink data signals with respect to the second service type. As shown in FIG. 3, the downlink data signals relevant to the first service type includes the first downlink data signal and the third downlink data signal so that the first codebook CB1 includes two bits, and the downlink data signals relevant to the second service type includes the second downlink data signal and the fourth downlink data signal so that the second codebook CB2 includes two bits.

In another example, please refer to FIG. 4C in which both the first codebook type of the first codebook CB1 and the second codebook type of the second codebook CB2 are the combination of the semi-static codebook type and the dynamic codebook type (hereinafter called modified semi-dynamic codebook type). In details, in the codebook of the semi-static codebook type, regarding one service type, the UE 2 still needs to respond with NACKs for the downlinks signal irrelevant to this service type (including the downlink data signals not transmitted to the UE 2, and the downlink data signals transmitted to the UE 2, but not belonging to the same service type). However, in the codebook of the modified semi-dynamic codebook type, regarding one service type, the UE 2 only needs to respond with NACKs for the downlink signal not transmitted to the UE 2 in these downlink signals irrelevant to this service type to reduce the data amount.

For example, when generating the first codebook CB1, the UE 2 responds with ACK or NACK in the bits whose corresponding first type sub-slots have the downlink data signals with respect to the first service type according to the decoding result, and responds with NACKs in the bits whose corresponding first type sub-slots do not have downlink data signal with respect to the first service type and do not have downlink data signal with respect to the second service type. In other words, since there are downlink data signals in the first type sub-slot FS2 of the slot TS2 and in the sub-slot FS2 of the slot TS3, the UE 2 will not report for the two first type sub-slots in the first codebook CB1 (i.e., not report NACKs for the two first type sub-slots).

Similarly, when generating the second codebook CB2, the UE 2 responds with ACK or NACK in the bits whose corresponding second type sub-slots have the downlink data signals with respect to the second service type according to the decoding result, and responds with NACKs in the bits whose corresponding second type sub-slots do not have downlink data signal with respect to the first service type and do not have downlink data signal with respect to the second service type. In other words, since there are downlink data signals in the second type sub-slot SS1 of the slot TS1 and in the sub-slot SS2 of the slot TS2, the UE 2 will not report for the two second type sub-slots in the second codebook CB2 (i.e., not report NACKs for the two second type sub-slots).

It shall be appreciated that the determination of whether there is a downlink data signal in the sub-slot depends whether if the starting symbol of the PDSCH resource is located in the sub-slot for illustration, but it is not limited thereto. Besides, the BS 1 can inform the UE 2 about the first feedback timing set, the second feedback timing set and using which codebook type by the higher layer signaling, e.g., the RRC message.

Figure 5:
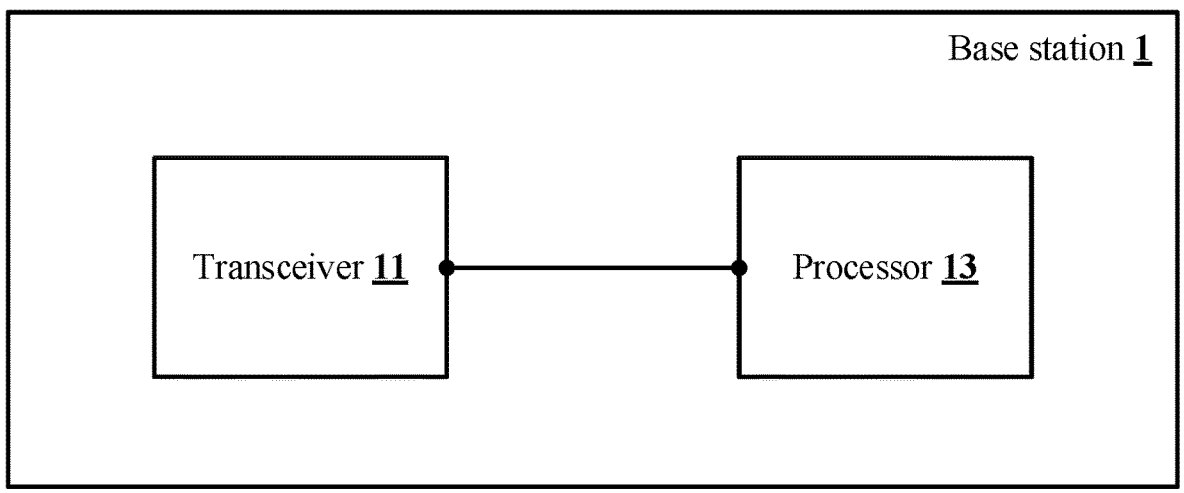
FIG. 5 is a schematic view of the BS 1 according to the present invention.

A sixth embodiment of the present invention is as shown in FIG. 5, which is a schematic view of the BS 1 according to the present invention. The BS 1 in the 5G mobile communication system is usually called a "gNB." The BS 1 comprises a transceiver 11 and a processor 13. The processor 13 is electrically connected to the transceiver 11. It shall be appreciated that, for simplifying the description, other components of the BS 1 such as the storage, the housing, the power supply module and other components irrelevant to the present invention are omitted from depiction in the drawings. The processor 13 may be any of various processors, Central Processing Units (CPUs), microprocessors, digital signal processors, or other computing devices known to those of ordinary skill in the art.

Corresponding to the first embodiment, the process 13 generates the first DCI with respect to the first service type, and transmits the first DCI on the first PDCCH resource to the UE 2 via the transceiver 11. The first DCI indicates the first PDSCH resource DDR1 and the first PUCCH resource UCR1. The first PUCCH resource UCR1 is used by the UE 2 for transmitting the first HARQ-ACK message. The first HARQ-ACK message is used for indicating whether the first downlink data signal carried on the first PDSCH resource DDR1 is received correctly by the UE 2.

The processor 13 further generates the second DCI with respect to the second service type, and transmits the second DCI on the second PDCCH resource DCR2 to the UE 2 via the transceiver 11. The second DCI indicates the second PDSCH resource DDR2 and the second PUCCH resource UCR2. The second PUCCH resource UCR2 is used by the UE 2 for transmitting the second HARQ-ACK message. The second HARQ-ACK message is used for indicating whether the second downlink data signal carried on the second PDSCH resource DDR2 is received correctly by the UE 2.

The first starting symbol of the first PUCCH resource UCR1 is located within a first type assigned sub-slot of a plurality of first type sub-slots of the slot, and the second starting symbol of the second PUCCH resource UCR2 is located within a second type assigned sub-slot of a plurality of second type sub-slots of the slot. The slot is defined as being constituted by a first number of the first type sub-slots and defined as being constituted by a second number of the second type sub-slots, as the slot TS shown in FIG. 1. The first PUCCH resource UCR1 is at least distributed in one of the first type sub-slots of the slot, and the second PUCCH resource UCR2 is at least distributed in one of the second type sub-slots of the slot. In other words, the radio resource occupied by the first PUCCH resource UCR1 may cover over more than two first type sub-slots in the time domain, and the radio resource occupied by the first PUCCH resource UCR2 may cover over more than two second type sub-slots in the time domain.

Each of the first type sub-slots is defined as having at least one first available PUCCH resource set, and each of the second type sub-slots is defined as having at least one second available PUCCH resource set. The first PUCCH resource is one of a plurality of PUCCH resources in a first PUCCH resource set of the at least one first available PUCCH resource set, and a starting symbol of each of the PUCCH resources in the first PUCCH resource set is located within the first type assigned sub-slot. The second PUCCH resource is one of a plurality of PUCCH resources in a second PUCCH resource set of the at least one second available PUCCH resource set, and a starting symbol of each of the PUCCH resources in the second PUCCH resource set is located within the second type assigned sub-slot. The first service type and the second service type have different priorities.

In other embodiments, the first DCI has a first CRC, and the second DCI has a second CRC. The first CRC and the second CRC are scrambled by different RNTIs, respectively, for the UE 2 to identify that the first DCI belongs to the first service type and the second DCI belongs to the second service type.

In other embodiments, the first PDCCH resource DCR1 and the second PDCCH resource DCR2 are in different time-frequency positions for the UE 2 to identify that the first DCI belongs to the first service type and the second DCI belongs to the second service type.

In other embodiments, each of the first DCI and the second DCI has a service type indicator for the UE 2 to identify that the first DCI belongs to the first service type and the second DCI belongs to the second service type.

In other embodiments, the first DCI and the second DCI have different numbers of bits for the UE 2 to identify that the first DCI belongs to the first service type and the second DCI belongs to the second service type.

Corresponding to the second embodiment, the first DCI includes the first HARQ feedback timing indicator $K_{1\text{-}1}$, and the second DCI includes the second HARQ feedback timing indicator $K_{1\text{-}2}$. The first value of the first HARQ feedback indicator $K_{1\text{-}1}$ maps the first PUCCH resource UCR1 to the first type assigned sub-slot, and the second value of the second HARQ feedback indicator $K_{1\text{-}2}$ maps the second PUCCH resource UCR2 to the second type assigned sub-slot. The first value is selected from a first feedback timing set, and the second value is selected from a second feedback timing set. Each of a plurality values in the first feedback timing set represents a sub-slot offset of a number of the first type sub-slots for mapping to the first type assigned sub-slot, and each of a plurality values in the second feedback timing set represents a sub-slot offset of a number of the second type sub-slots for mapping to the second type assigned sub-slot.

In other embodiment, the processor 13 further generates the third DCI with respect to the first service type, and transmits the third DCI on the third PDCCH resource DCR3 to the UE 2 via the transceiver 11. The third DCI indicates the third PDSCH resource DDR3 and the third PUCCH resource UCR3, and the third PUCCH resource UCR3 is used by the UE 2 for transmitting the first HARQ-ACK message. The first HARQ-ACK message is further used for indicating whether the third downlink data signal carried on the third PDSCH resource DDR3 is received correctly by the UE 2.

Moreover, the processor 13 further generates the fourth DCI with respect to the second service type, and transmits the fourth DCI on the fourth PDCCH resource DCR4 to the UE 2 via the transceiver 11. The fourth DCI indicates the fourth PDSCH resource DDR4 and the fourth PUCCH resource UCR4, and the fourth PUCCH resource UCR4 is used by the UE 2 for transmitting the second HARQ-ACK message. The second HARQ-ACK message is further used for indicating whether the fourth downlink data signal carried on the fourth PDSCH resource DDR4 is received correctly by the UE 2.

The third DCI includes the third HARQ feedback timing indicator $K_{1\text{-}3}$. The third value of the third HARQ feedback indicator $K_{1\text{-}3}$ maps the third PUCCH resource UCR3 to the first type assigned sub-slot, and the third value is selected from the first feedback timing set. The first PUCCH resource UCR1 and the third PUCCH resource UCR3 belong to the first PUCCH resource set. The fourth DCI includes the fourth HARQ feedback timing indicator $K_{1\text{-}4}$. The fourth value of the fourth HARQ feedback indicator $K_{1\text{-}4}$ maps the fourth PUCCH resource UCR4 to the second type assigned sub-slot, and the fourth value is selected from the second feedback timing set. The second PUCCH resource UCR2 and the fourth PUCCH resource UCR4 belong to the second PUCCH resource set.

In other embodiments, the first DCI includes the first PRI, the second DCI includes the second PRI, the third DCI includes the third PRI, and the fourth DCI includes the fourth PRI. The first PRI is used for indicating the first position of the first PUCCH resource URC1 of the first PUCCH resource set, and the second PRI is used for indicating the second position of the second PUCCH resource UCR2 of the second PUCCH resource set. The third PRI is used for indicating the third position of the third PUCCH resource UCR3 of the first PUCCH resource set, and the fourth PRI is used for indicating the fourth position of the fourth PUCCH resource UCR4 of the second PUCCH resource set.

In other embodiments, the PUCCH format of each of the PUCCH resources in the first PUCCH resource set is identical or different to the PUCCH format of each of the PUCCH resources in the second PUCCH resource set. In other embodiments, the PUCCH format of each of the PUCCH resources in the first PUCCH resource set has an identical or different maximum code rate to a PUCCH format of each of the PUCCH resources in the second PUCCH resource set.

In other embodiments, the PUCCH resources with respect to each of the first type sub-slots is configured with the first codebook type, and the PUCCH resources with respect to each of the second type sub-slots is configured with the second codebook type. The first HARQ-ACK message is generated in the form of the first codebook CB1 of the first codebook type, and the second HARQ-ACK message is generated in the form of a second codebook of the second codebook type. Each of the first codebook type and the second codebook type is one of a semi-static codebook type, a dynamic codebook type or a combination thereof.

In other embodiments, the second PDSCH resource DDR2 is configured to be after the first PDSCH resource DDR1 in the time domain, and the second PUCCH resource UCR2 is configured to be advanced to the first PUCCH resource UCR1 in the time domain.

In other embodiments, the processor 13 further generates the RRC message and transmits the RRC message to the UE 2 via the transceiver 11. The RRC message indicates that the slot is defined as being constituted by the first number of the first type sub-slots and defined as being constituted by the second number of the second type sub-slots.

In other embodiments, each of the first PDSCH resource DDR1 and the second PDSCH resource DDR2 is a semi-persistent scheduling (SPS) resource.

Figure 6:
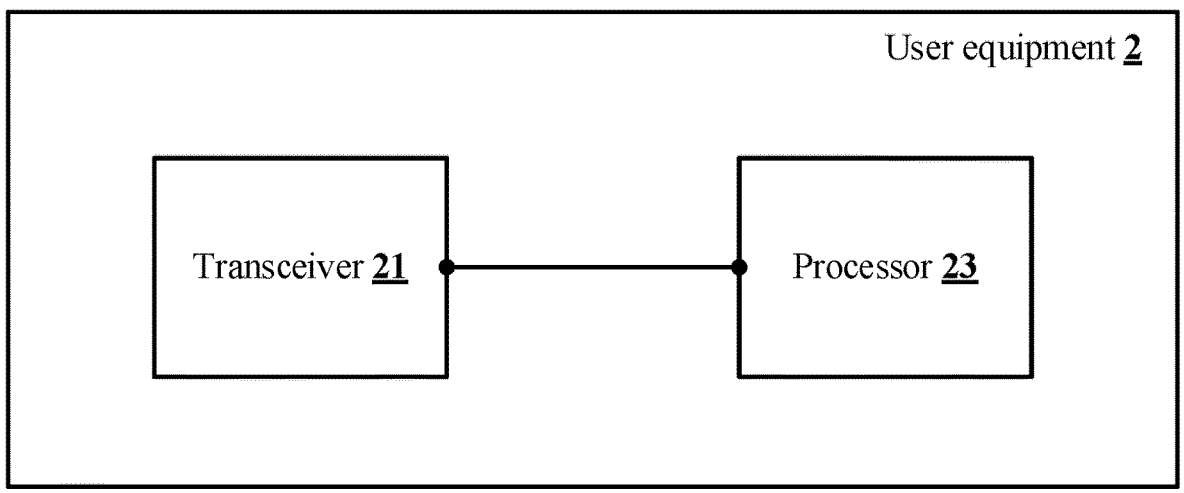
FIG. 6 is a schematic view of the UE 2 according to the present invention.

A seventh embodiment of the present invention is as shown in FIG. 6, which is a schematic view of the UE 2 according to the present invention. The UE 2 comprises a transceiver 21 and a processor 23. The processor 23 is electrically connected to the transceiver 21. For simplifying the description, other components of the UE 2 such as the storage, the housing, the power supply module and other components irrelevant to the present invention are omitted from depiction in the drawings. The processor 23 may be any of various processors, Central Processing Units (CPUs), microprocessors, digital signal processors, or other computing devices known to those of ordinary skill in the art.

The processor 23 receives the first DCI on the first PDCCH resource DCR1 from the BS 1 via the transceiver 21. The first DCI indicates the first PDSCH resource DDR1 and the first PUCCH resource UCR1. The first PUCCH resource UCR1 is used by the UE 2 for transmitting the first HARQ-ACK message, and the first HARQ-ACK message is used for indicating whether the first downlink data signal carried on the first PDSCH resource DDR1 is received correctly by the UE 2.

Next, the processor 23 receives second DCI on the second PDCCH resource DCR2 from the BS 1 via the transceiver 21. The second DCI indicates the second PDSCH resource DRR2 and the second PUCCH resource UCR2. The second PUCCH resource UCR2 is used by the UE 2 for transmitting the second HARQ-ACK message, and the second HARQ-ACK message is used for indicating whether the second downlink data signal carried on the second PDSCH resource DDR2 is received correctly by the UE 2.

A first starting symbol of the first PUCCH resource UCR1 is located within a first type assigned sub-slot of a plurality of first type sub-slots of a slot, and a second starting symbol of the second PUCCH resource UCR2 is located within a second type assigned sub-slot of a plurality of second type sub-slots of the slot. The slot is defined as being constituted by a first number of the first type sub-slots and defined as being constituted by a second number of the second type sub-slots. Each of the first type sub-slots is defined as having at least one first available PUCCH resource set, and each of the second type sub-slots is defined as having at least one second available PUCCH resource set.

The first PUCCH resource UCR1 is one of a plurality of PUCCH resources in a first PUCCH resource set of the at least one first available PUCCH resource set, and a starting symbol of each of the PUCCH resources in the first PUCCH resource set is located within the first type assigned sub-slot. The second PUCCH resource UCR2 is one of a plurality of PUCCH resources in a second PUCCH resource set of the at least one second available PUCCH resource set, and a starting symbol of each of the PUCCH resources in the second PUCCH resource set is located within the second type assigned sub-slot. The first DCI corresponds to a first service type, and the second DCI corresponds to a second service type. The first service type and the second service type have different priorities.

In other embodiments, the first DCI includes a first HARQ feedback timing indicator $K_{1-1}$. The first value of the first HARQ feedback indicator $K_{1-1}$ maps the first PUCCH resource UCR1 to the first type assigned sub-slot, and the first value is selected from a first feedback timing set. Each of a plurality values in the first feedback timing set represents a sub-slot offset of a number of the first type sub-slots for mapping to the first type assigned sub-slot. Similarly, the second DCI includes a second HARQ feedback timing indicator $K_{1-2}$. The second value of the second HARQ feedback indicator $K_{1-2}$ maps the second PUCCH resource UCR2 to the second type assigned sub-slot, and the second value is selected from a second feedback timing set. Each of a plurality values in the second feedback timing set represents a sub-slot offset of a number of the second type sub-slots for mapping to the second type assigned sub-slot.

In other embodiments, the processor 23 further receives the third DCI on the third PDCCH resource DCR3 from the BS 1 via the transceiver 21. The third DCI indicates the third PDSCH resource DDR3 and the third PUCCH resource UCR3. The third PUCCH resource is used by the UE 2 for transmitting the first HARQ-ACK message. The first HARQ-ACK message is further used for indicating whether the third downlink data signal carried on the third PDSCH resource DDR3 is received correctly by the UE 2. The first PUCCH resource UCR1 and the third PUCCH resource UCR3 belong to the first PUCCH resource set. Moreover, the processor 23 receives the fourth DCI on the fourth PDCCH resource DCR4 from the BS 1 via the transceiver 21. The fourth DCI indicates the fourth PDSCH resource DDR4 and the fourth PUCCH resource DCR4. The fourth PUCCH resource UCR4 is used by the UE 2 for transmitting the second HARQ-ACK message, and the second HARQ-ACK message is further used for indicating whether the fourth downlink data signal carried on the fourth PDSCH resource DDR4 is received correctly by the UE 2. The second PUCCH resource UCR2 and the fourth PUCCH resource UCR4 belong to the second PUCCH resource set.

The third DCI includes the third HARQ feedback timing indicator $K_{1-3}$. Third value of the third HARQ feedback indicator $K_{1-3}$ maps the third PUCCH resource UCR3 to the first type assigned sub-slot, and the third value is selected from the first feedback timing set. Similarly, the fourth DCI includes the fourth HARQ feedback timing indicator $K_{1-4}$. The fourth value of the fourth HARQ feedback indicator $K_{1-4}$ maps the fourth PUCCH resource UCR4 to the second type assigned sub-slot, and the fourth value is selected from the second feedback timing set.

In other embodiments, the first DCI includes the first PUCCH resource indicator (PRI), the second DCI includes the second PRI, the third DCI includes the third PRI, and the fourth DCI includes the fourth PRI. The first PRI is used for indicating the first position of the first PUCCH resource UCR1 of the first PUCCH resource set. The second PRI is used for indicating the second position of the second PUCCH resource UCR2 of the second PUCCH resource set. The third PRI is used for indicating a third position of the third PUCCH resource UCR3 of the first PUCCH resource set. The fourth PRI is used for indicating the fourth position of the fourth PUCCH resource UCR4 of the second PUCCH resource set. The processor 23 transmits the first HARQ-ACK message on the third PUCCH resource UCR3 via the transceiver 21 according to the third PRI, and transmits the second HARQ-ACK message on the fourth PUCCH resource UCR4 via the transceiver 21 according to the fourth PRI.

In other embodiments, the processor 23 further determines whether an overlapped part exists between the first PUCCH resource UCR1 and the second PUCCH resource UCR2. When the overlapped part does not exist between the first PUCCH resource UCR1 and the second PUCCH resource UCR2, the processor 23 transmits the first HARQ-ACK message on the first PUCCH resource UCR1 and the second HARQ-ACK message on the second PUCCH resource UCR2 to the BS 1 via the transceiver 21. When the overlapped part exists between the first PUCCH resource UCR1 and the second PUCCH resource UCR2, for the overlapped part, the processor 23 only transmits the second HARQ-ACK message on the second PUCCH resource UCR2 to the BS 1 via the transceiver 21. The priority of the second service type which the second HARQ-ACK message corresponds to is higher than the priority of the first service type which the first HARQ-ACK message corresponds to.

In other embodiments, the processor 23 further determines whether an overlapped part exists between the first PUCCH resource UCR1 and the second PUCCH resource UCR2. When the overlapped part does not exist between the first PUCCH resource UCR1 and the second PUCCH resource UCR2, the processor 23 transmits the first HARQ-ACK message on the first PUCCH resource UCR1 and the second HARQ-ACK message on the second PUCCH resource UCR2 to the BS 1 via the transceiver 21. When the overlapped part exists between the first PUCCH resource UCR1 and the second PUCCH resource UCR2, for the overlapped part, the processor 23 transmits the first HARQ-ACK message and the second HARQ-ACK message on the second PUCCH resource UCR2 to the BS 1 via the transceiver 21. The priority of the second service type which the second HARQ-ACK message corresponds to is higher than the priority of the first service type which the first HARQ-ACK message corresponds to.

In other embodiments, the PUCCH resources with respect to each of the first type sub-slots is configured with the first codebook type, and the PUCCH resource with respect to each of the second type sub-slots is configured with the second codebook type. The first HARQ-ACK message is generated in the form of the first codebook CB1 of the first codebook type, and the second HARQ-ACK message is generated in the form of the second codebook CB2 of the second codebook type. Each of the first codebook type and the second codebook type is one of the semi-static codebook type, the dynamic codebook type or the combination thereof.

According to the above descriptions, the present invention defines the slot as being constituted by a first number of the first type sub-slots based on a first service type and as being constituted by a second number of the second type sub-slots based on a second service type so as to make the BS able to configure two independent PUCCH resources in the same slot according to the different service types for the UE to transmit the HARQ-ACK messages on the corresponding PUCCH resources, respectively, for the different service types. Therefore, the resource configuration mechanism of the present invention is able to configure the required resources in response to the transmission requirements of the different service types to make the utilization of the PUCCH resources flexible to meet the ultra-reliable and low latency requirement of the URRLC service.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station (BS) for a mobile communication system, comprising:
   a transceiver; and
   a processor electrically connected to the transceiver, being configured to execute operations as follows:
      generating first downlink control information (DCI) with respect to a first service type;
      transmitting the first DCI on a first physical downlink control channel (PDCCH) resource to a user equipment (UE) via the transceiver, the first DCI indicating a first physical downlink shared channel (PDSCH) resource and a first physical uplink control channel (PUCCH) resource, the first PUCCH resource being used by the UE for transmitting a first hybrid automatic repeat request acknowledgement (HARQ-ACK) message, the first HARQ-ACK message being used for indicating whether a first downlink data signal carried on the first PDSCH resource is received correctly by the UE;
      generating second DCI with respect to a second service type;
      transmitting the second DCI on a second PDCCH resource to the UE via the transceiver, the second DCI indicating a second PDSCH resource and a second PUCCH resource, the second PUCCH resource being used by the UE for transmitting a second HARQ-ACK message, the second HARQ-ACK message being used for indicating whether a second downlink data signal carried on the second PDSCH resource is received correctly by the UE;
      generating third DCI with respect to the first service type;
      transmitting the third DCI on a third PDCCH resource to the UE via the transceiver, the third DCI indicating a third PDSCH resource and a third PUCCH resource, the third PUCCH resource being used by the UE for transmitting the first HARQ-ACK message, the first HARQ-ACK message being further used for indicating whether a third downlink data signal carried on the third PDSCH resource is received correctly by the UE;
      generating fourth DCI with respect to the second service type; and
      transmitting the fourth DCI on a fourth PDCCH resource to the UE via the transceiver, the fourth DCI indicating a fourth PDSCH resource and a fourth PUCCH resource, the fourth PUCCH resource being used by the UE for transmitting the second HARQ-ACK message, the second HARQ-ACK message being further used for indicating whether a fourth downlink data signal carried on the fourth PDSCH resource is received correctly by the UE;

wherein the first DCI includes a first HARQ feedback timing indicator, the second DCI includes a second HARQ feedback timing indicator, the third DCI includes a third HARQ feedback timing indicator, the fourth DCI includes a fourth HARQ feedback timing indicator, a first value of the first HARQ feedback indicator maps the first PUCCH resource to the first type assigned sub-slot, a second value of the second HARQ feedback indicator maps the second PUCCH resource to the second type assigned sub-slot, a third value of the third HARQ feedback indicator maps the third PUCCH resource to the first type assigned sub-slot, a fourth value of the fourth HARQ feedback indicator maps the fourth PUCCH resource to the second type assigned sub-slot, the first value is selected from a first feedback timing set, the second value is selected from a second feedback timing set, the third value is selected from the first feedback timing set, and the fourth value is selected from the second feedback timing set, each of a plurality values in the first feedback timing set represents a sub-slot offset of a number of the first type sub-slots for mapping to the first type assigned sub-slot, and each of a plurality values in the second feedback timing set represents a sub-slot offset of a number of the second type sub-slots for mapping to the second type assigned sub-slot;

wherein a first starting symbol of the first PUCCH resource is located within a first type assigned sub-slot of a plurality of first type sub-slots of a slot, a second starting symbol of the second PUCCH resource is located within a second type assigned sub-slot of a plurality of second type sub-slots of the slot, the slot is defined as being constituted by a first number of the first type sub-slots and defined as being constituted by a second number of the second type sub-slots;

wherein each of the first type sub-slots is defined as having at least one first available PUCCH resource set, each of the second type sub-slots is defined as having at least one second available PUCCH resource set, the first PUCCH resource is one of a plurality of PUCCH resources in a first PUCCH resource set of the at least one first available PUCCH resource set, a first starting symbol of each of the PUCCH resources in the first PUCCH resource set is located within the first type assigned sub-slot, the second PUCCH resource is one of a plurality of PUCCH resources in a second PUCCH resource set of the at least one second available PUCCH resource set, and a second starting symbol of each of the PUCCH resources in the second PUCCH resource set is located within the second type assigned sub-slot;

wherein the first PUCCH resource and the third PUCCH resource belong to the first PUCCH resource set, and the second PUCCH resource and the fourth PUCCH resource belong to the second PUCCH resource set; and wherein the first service type and the second service type have different priorities.

2. The base station of claim 1, wherein the first DCI has a first cyclic redundancy check (CRC), the second DCI has a second CRC, and the first CRC and the second CRC are scrambled by different radio network temporary identifiers (RNTIs), respectively, for the UE to identify that the first DCI belongs to the first service type and the second DCI belongs to the second service type.

3. The base station of claim 1, wherein the first PDCCH resource and the second PDCCH resource are in different time-frequency positions for the UE to identify that the first DCI belongs to the first service type and the second DCI belongs to the second service type.

4. The base station of claim 1, wherein each of the first DCI and the second DCI has a service type indicator for the UE to identify that the first DCI belongs to the first service type and the second DCI belongs to the second service type.

5. The base station of claim 1, wherein the first DCI and the second DCI have different numbers of bits for the UE to identify that the first DCI belongs to the first service type and the second DCI belongs to the second service type.

6. The base station of claim 1, wherein the first DCI includes a first PUCCH resource indicator (PRI), the second DCI includes a second PRI, the third DCI includes a third PRI, and the fourth DCI includes a fourth PRI;

wherein the first PRI is used for indicating a first position of the first PUCCH resource of the first PUCCH resource set, the second PRI is used for indicating a second position of the second PUCCH resource of the second PUCCH resource set, the third PRI is used for indicating a third position of the third PUCCH resource of the first PUCCH resource set, the fourth PRI is used for indicating a fourth position of the fourth PUCCH resource of the second PUCCH resource set.

7. The base station of claim 1, wherein a PUCCH format of each of the PUCCH resources in the first PUCCH resource set is identical or different to a PUCCH format of each of the PUCCH resources in the second PUCCH resource set.

8. The base station of claim 1, wherein a PUCCH format of each of the PUCCH resources in the first PUCCH resource set has an identical or different maximum code rate to a PUCCH format of each of the PUCCH resources in the second PUCCH resource set.

9. The base station of claim 1, wherein the PUCCH resources with respect to each of the first type sub-slots is configured with a first codebook type, the PUCCH resource with respect to each of the second type sub-slots is configured with a second codebook type, the first HARQ-ACK message is generated in the form of a first codebook of the first codebook type, and the second HARQ-ACK message is generated in the form of a second codebook of the second codebook type;

wherein each of the first codebook type and the second codebook type is one of a semi-static codebook type, a dynamic codebook type or a combination thereof.

10. The base station of claim 1, wherein the second PDSCH resource is configured to be after the first PDSCH resource in a time domain, and the second PUCCH resource is configured to be advanced to the first PUCCH resource in the time domain.

11. The base station of claim 1, wherein the first PUCCH resource is at least distributed in one of the first type sub-slots of the slot, and the second PUCCH resource is at least distributed in one of the second type sub-slots of the slot.

12. The base station of claim 1, wherein the processor further generates a radio resource control (RRC) message and transmits the RRC message to the UE via the transceiver, and the RRC message indicates that the slot is defined as being constituted by the first number of the first type sub-slots and defined as being constituted by the second number of the second type sub-slots.

13. The base station of claim 1, wherein each of the first PDSCH resource and the second PDSCH resource is a semi-persistent scheduling (SPS) resource.

14. A user equipment (UE) for a mobile communication system, comprising:
a transceiver; and
a processor electrically connected to the transceiver, being configured to execute operations as follows:
receiving first downlink control information (DCI) on a first physical downlink control channel (PDCCH) resource from a base station (BS) via the transceiver, the first DCI indicating a first physical downlink shared channel (PDSCH) resource and a first physical uplink control channel (PUCCH) resource, the first PUCCH resource being used by the UE for transmitting a first hybrid automatic repeat request acknowledgement (HARQ-ACK) message, the first HARQ-ACK message being used for indicating whether a first downlink data signal carried on the first PDSCH resource is received correctly by the UE;
receiving second DCI on a second PDCCH resource from the BS via the transceiver, the second DCI indicating a second PDSCH resource and a second PUCCH resource, the second PUCCH resource being used by the UE for transmitting a second HARQ-ACK message, the second HARQ-ACK message being used for indicating whether a second downlink data signal carried on the second PDSCH resource is received correctly by the UE;
receiving third DCI on a third PDCCH resource from the BS via the transceiver, the third DCI indicating a third PDSCH resource and a third PUCCH resource, the third PUCCH resource being used by the UE for transmitting the first HARQ-ACK message, the first HARQ-ACK message being further used for indicating whether a third downlink data signal carried on the third PDSCH resource is received correctly by the UE; and
receiving fourth DCI on a fourth PDCCH resource from the BS via the transceiver, the fourth DCI indicating a fourth PDSCH resource and a fourth PUCCH resource, the fourth PUCCH resource being used by the UE for transmitting the second HARQ-ACK message, the second HARQ-ACK message being further used for indicating whether a fourth downlink data signal carried on the fourth PDSCH resource is received correctly by the UE;
wherein the first DCI includes a first HARQ feedback timing indicator, the second DCI includes a second HARQ feedback timing indicator, the third DCI includes a third HARQ feedback timing indicator, the fourth DCI includes a fourth HARQ feedback timing indicator, a first value of the first HARQ feedback indicator maps the first PUCCH resource to the first type assigned sub-slot, a second value of the second HARQ feedback indicator maps the second PUCCH resource to the second type assigned sub-slot, a third value of the third HARQ feedback indicator maps the third PUCCH resource to the first type assigned sub-slot, a fourth value of the fourth HARQ feedback indicator maps the fourth PUCCH resource to the second type assigned sub-slot, the first value is selected from a first feedback timing set, the second value is selected from a second feedback timing set, the third value is selected from the first feedback timing set, and the fourth value is selected from the second feedback timing set, each of a plurality values in the first feedback timing set represents a sub-slot offset of a number of the first type sub-slots for mapping to the first type assigned sub-slot, and each of a plurality values in the second feedback timing set represents a sub-slot offset of a number of the second type sub-slots for mapping to the second type assigned sub-slot;
wherein a first starting symbol of the first PUCCH resource is located within a first type assigned sub-slot of a plurality of first type sub-slots of a slot, a second starting symbol of the second PUCCH resource is located within a second type assigned sub-slot of a plurality of second type sub-slots of the slot, the slot is defined as being constituted by a first number of the first type sub-slots and defined as being constituted by a second number of the second type sub-slots;
wherein each of the first type sub-slots is defined as having at least one first available PUCCH resource set, each of the second type sub-slots is defined as having at least one second available PUCCH resource set, the first PUCCH resource is one of a plurality of PUCCH resources in a first PUCCH resource set of the at least one first available PUCCH resource set, a first starting symbol of each of the PUCCH resources in the first PUCCH resource set is located within the first type assigned sub-slot, the second PUCCH resource is one of a plurality of PUCCH resources in a second PUCCH resource set of the at least one second available PUCCH resource set, and a second starting symbol of each of the PUCCH resources in the second PUCCH resource set is located within the second type assigned sub-slot;
wherein the first PUCCH resource and the third PUCCH resource belong to the first PUCCH resource set, and the second PUCCH resource and the fourth PUCCH resource belong to the second PUCCH resource set; and
wherein the first DCI corresponds to a first service type, the second DCI corresponds to a second service type, and the first service type and the second service type have different priorities.

15. The user equipment of claim 14, wherein the first DCI includes a first PUCCH resource indicator (PRI), the second DCI includes a second PRI, the third DCI includes a third PRI, and the fourth DCI includes a fourth PRI;
wherein the first PRI is used for indicating a first position of the first PUCCH resource of the first PUCCH resource set, the second PRI is used for indicating a second position of the second PUCCH resource of the second PUCCH resource set, the third PRI is used for indicating a third position of the third PUCCH resource of the first PUCCH resource set, the fourth PRI is used for indicating a fourth position of the fourth PUCCH resource of the second PUCCH resource set;
wherein the processor transmits the first HARQ-ACK message on the third PUCCH resource via the transceiver according to the third PRI, and transmits the second HARQ-ACK message on the fourth PUCCH resource via the transceiver according to the fourth PRI.

16. The user equipment of claim 14, wherein the processor further executes operations as follows:
determining whether an overlapped part exists between the first PUCCH resource and the second PUCCH resource;
transmitting the first HARQ-ACK message on the first PUCCH resource and the second HARQ-ACK message on the second PUCCH resource to the BS via the transceiver when the overlapped part does not exist between the first PUCCH resource and the second PUCCH resource; and for the overlapped part, only transmitting the second HARQ-ACK message on the second PUCCH resource to the BS via the transceiver when the overlapped part exists between the first PUCCH resource and the second PUCCH resource;

wherein the priority of the second service type which the second HARQ-ACK message corresponds to is higher than the priority of the first service type which the first HARQ-ACK message corresponds to.

17. The user equipment of claim 14, wherein the processor further executes operations as follows:

determining whether an overlapped part exists between the first PUCCH resource and the second PUCCH resource;

transmitting the first HARQ-ACK message on the first PUCCH resource and the second HARQ-ACK message on the second PUCCH resource to the BS via the transceiver when the overlapped part does not exist between the first PUCCH resource and the second PUCCH resource; and for the overlapped part, transmitting the first HARQ-ACK message and the second HARQ-ACK message on the second PUCCH resource to the BS via the transceiver when the overlapped part exists between the first PUCCH resource and the second PUCCH resource;

wherein the priority of the second service type which the second HARQ-ACK message corresponds to is higher than the priority of the first service type which the first HARQ-ACK message corresponds to.

18. The user equipment of claim 14, wherein the PUCCH resources with respect to each of the first type sub-slots is configured with a first codebook type, the PUCCH resource with respect to each of the second type sub-slots is configured with a second codebook type, the first HARQ-ACK message is generated in the form of a first codebook of the first codebook type, and the second HARQ-ACK message is generated in the form of a second codebook of the second codebook type;

wherein each of the first codebook type and the second codebook type is one of a semi-static codebook type, a dynamic codebook type or a combination thereof.

* * * * *